(12) United States Patent
Sakamoto

(10) Patent No.: US 8,934,047 B2
(45) Date of Patent: Jan. 13, 2015

(54) ZOOM LENS AND IMAGE PICKUP APPARATUS INCLUDING THE SAME

(71) Applicant: Canon Kabushiki Kaisha, Tokyo (JP)

(72) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/953,172

(22) Filed: Jul. 29, 2013

(65) Prior Publication Data

US 2014/0049672 A1    Feb. 20, 2014

(30) Foreign Application Priority Data

Aug. 17, 2012 (JP) ................................ 2012-180898

(51) Int. Cl.

| | |
|---|---|
| *G02B 13/16* | (2006.01) |
| *H04N 5/225* | (2006.01) |
| *H04N 5/262* | (2006.01) |
| *G02B 9/60* | (2006.01) |
| *G02B 15/14* | (2006.01) |
| *H04N 5/335* | (2011.01) |
| *G02B 15/17* | (2006.01) |

(52) U.S. Cl.
CPC ................ *G02B 15/14* (2013.01); *H04N 5/335* (2013.01); *G02B 15/17* (2013.01)
USPC .......................... 348/335; 348/240.3; 359/765

(58) Field of Classification Search
None
See application file for complete search history.

(56) References Cited

U.S. PATENT DOCUMENTS

| | | | | |
|---|---|---|---|---|
| 5,325,233 | A * | 6/1994 | Nakatsuji et al. | 359/684 |
| 5,532,881 | A * | 7/1996 | Nakatsuji et al. | 359/684 |
| 8,223,224 | B2 * | 7/2012 | Sakamoto | 348/240.3 |

FOREIGN PATENT DOCUMENTS

| | | |
|---|---|---|
| JP | 04-78807 A | 3/1992 |
| JP | 2002-169091 A | 6/2002 |

\* cited by examiner

*Primary Examiner* — Justin P Misleh
(74) *Attorney, Agent, or Firm* — Rossi, Kimms & McDowell LLP

(57) ABSTRACT

Provided is a zoom lens, including, in order from an object side to an image side: a first lens unit having a positive refractive power which does not move; a second lens unit having a negative refractive power which moves during zooming and focusing; a third lens unit having the negative refractive power which moves during zooming; a fourth lens unit having one of the negative refractive power and the positive refractive power; and a fifth lens unit having the positive refractive power, in which a lateral magnification ($\beta 2w$) of the second lens unit at a wide angle end when an object distance is infinity, and a ratio of a focal length (f2) of the second lens unit and a focal length (f3) of the third lens unit are appropriately set.

14 Claims, 13 Drawing Sheets

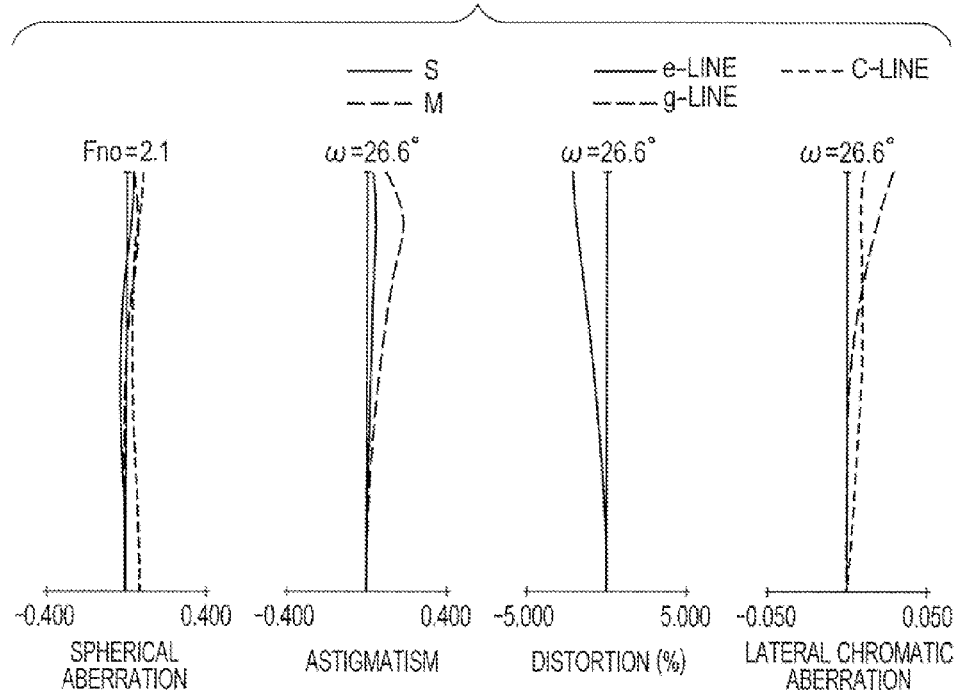
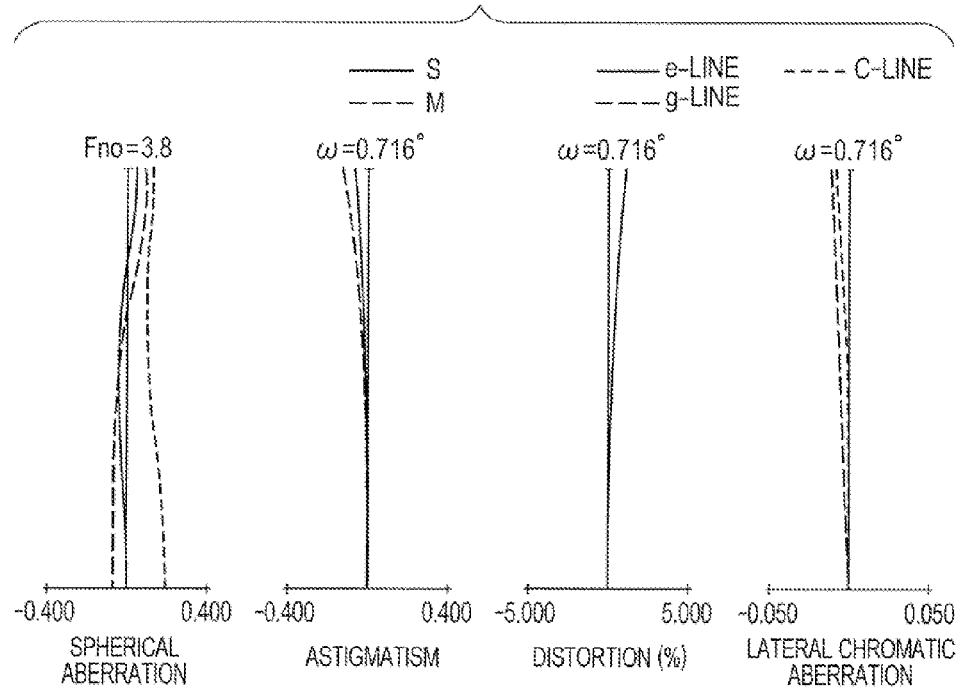

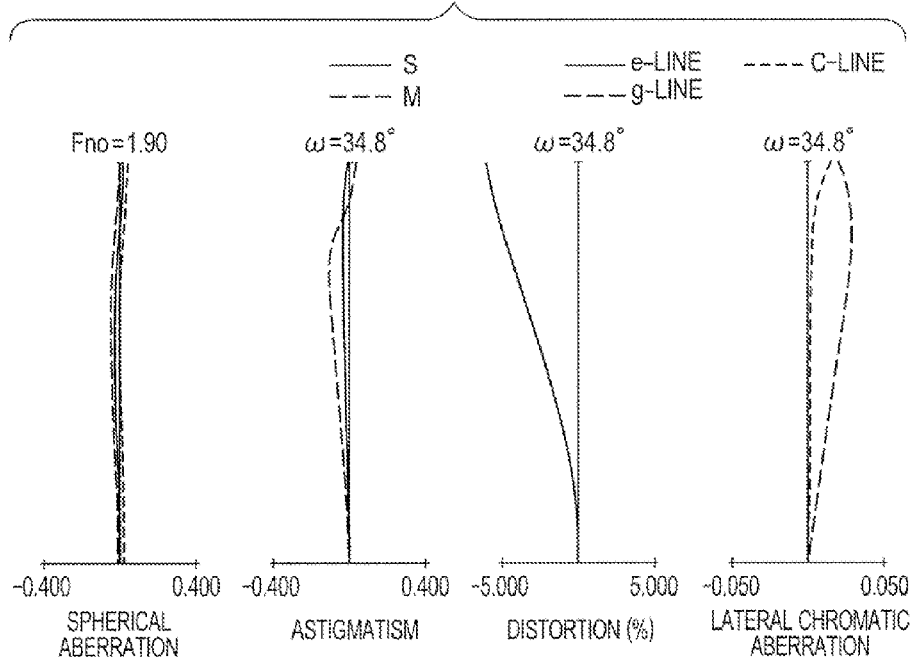
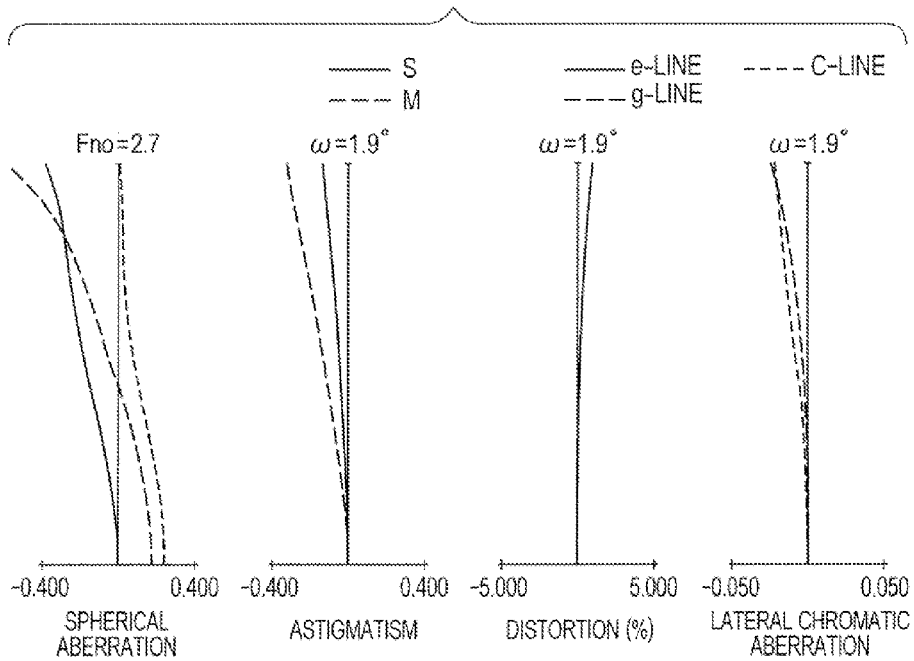

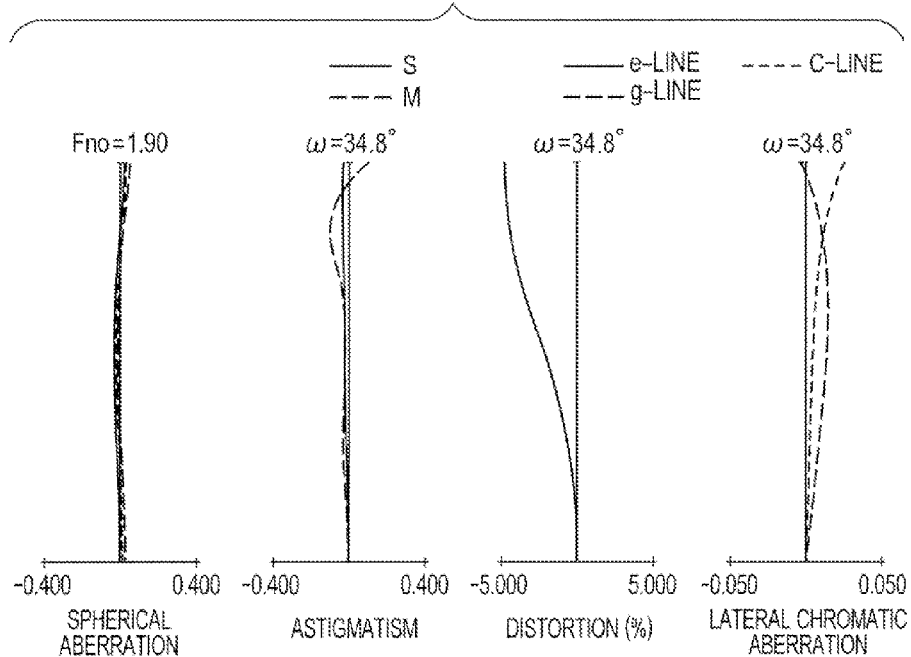
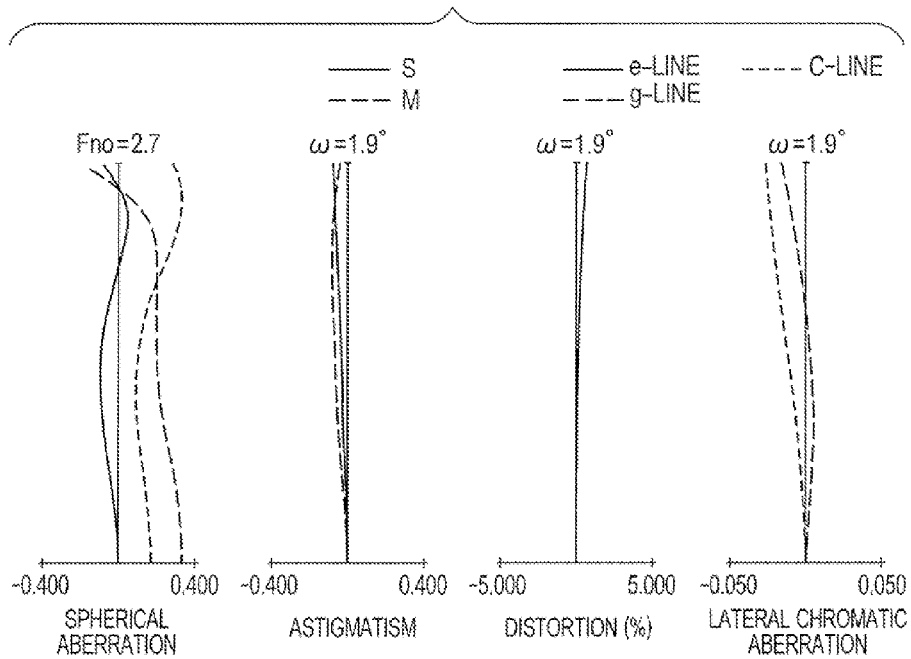

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a television camera, a video camera, a digital still camera, and a silver-halide film camera, for example.

2. Description of the Related Art

A zoom lens having a large aperture ratio, a high zoom ratio, and high optical performance is required for an image pickup apparatus such as a television camera, a silver-halide film camera, a digital camera, or a video camera.

Of those cameras, a zoom lens for the television camera is relatively easy to increase the angle of field and magnification and to reduce the size and weight, and hence there has conventionally often been used a four-unit zoom lens therefor. The four-unit zoom lens includes, in order from an object side, a first lens unit having a positive refractive power, a second lens unit having a negative refractive power which moves for zooming, a third lens unit for correcting an image plane that varies with the zooming, and a fourth lens unit having the positive refractive power for imaging.

In recent years, there has been proposed a zoom lens for the television camera in which the fourth lens unit having a small weight and volume constitutes a movable unit for focusing. In this manner, the size of the movable mechanism for focusing may be reduced, and the weight of the zoom lens may be suppressed.

For example, Japanese Patent Application Laid-Open Nos. H04-078807 and 2002-169091 each propose a zoom lens including a first lens unit having a positive refractive power, a second lens unit having a negative refractive power which moves for zooming, a third lens unit having the negative refractive power, and a fourth lens unit having the positive refractive power, in which the fourth lens unit is movable for focusing.

In the above-mentioned zoom lens of a so-called rear focus type, the focusing mechanism is disposed on an image side of the zooming mechanism. Therefore, compared to a case where an object distance is infinity, in a case where the object distance is on a close-up side of infinity (hereinafter also referred to as finite distance), a zoom ratio (ratio of focal lengths of the entire lens system at a wide angle end and a telephoto end) is reduced. In particular, when the magnification is increased in the above-mentioned zoom lens, the reduction in zoom ratio becomes more conspicuous. In other words, when the magnification is varied while photographing a subject at a small object distance, an image of the subject cannot be magnified to an extent that is expected.

Further, when the increase in magnification is to be achieved in the zoom lens of the above-mentioned type, especially at the telephoto end, an amount of movement of the lens unit for focusing is increased to increase the total length of the zoom lens. This makes the reduction in size of the zoom lens difficult.

SUMMARY OF THE INVENTION

In view of the above-mentioned circumstances, the present invention provides a zoom lens that is small in size and capable of achieving both a high magnification and suppression of a reduction in zoom ratio in a case where an object distance is on a close-up side of infinity compared to a case where the object distance is infinity.

A zoom lens according to one embodiment of the present invention includes, in order from an object side to an image side: a first lens unit having a positive refractive power which does not move; a second lens unit having a negative refractive power which moves during zooming and focusing; a third lens unit having the negative refractive power which moves during zooming; a fourth lens unit having one of the negative refractive power and the positive refractive power; and a fifth lens unit having the positive refractive power, in which the following conditions are satisfied:

$$-0.95 < 1/\beta 2w < 0.4; \text{ and}$$

$$1.2 < f2/f3 < 10,$$

where $\beta 2w$ is a lateral magnification of the second lens unit at a wide angle end when an object distance is infinity, and $f2$ and $f3$ are focal lengths of the second lens unit and the third lens unit, respectively.

According to the present invention, a zoom lens capable of achieving the reduction in size and the increase in magnification, as well as the suppression of the reduction in zoom ratio when the object distance is finite, and an image pickup apparatus including the zoom lens may be obtained.

Further features of the present invention will become apparent from the following description of exemplary embodiments with reference to the attached drawings.

BRIEF DESCRIPTION OF THE DRAWINGS

FIG. 2A is an aberration diagram at the wide angle end when an object distance is infinity according to Numerical Embodiment 1.

FIG. 2B is an aberration diagram at the telephoto end when the object distance is infinity according to Numerical Embodiment 1.

FIG. 8A is an aberration diagram at the wide angle end when the object distance is infinity according to Numerical Embodiment 4.

FIG. 8B is an aberration diagram at the telephoto end when the object distance is infinity according to Numerical Embodiment 4.

FIG. 10A is an aberration diagram at the wide angle end when the object distance is infinity according to Numerical Embodiment 5.

FIG. 10B is an aberration diagram at the telephoto end when the object distance is infinity according to Numerical Embodiment 5.

DESCRIPTION OF THE EMBODIMENTS

Now, a description is given of a zoom lens according to the present invention and an image pickup apparatus including the zoom lens.

The zoom lens according to the present invention includes, in order from an object side to an image side, a first lens unit L1 having a positive refractive power which does not move for zooming, a second lens unit L2 having a negative refractive power which moves during zooming, a third lens unit L3 having the negative refractive power which moves during zooming, a fourth lens unit L4 having the negative or positive refractive power, and a fifth lens unit L5 having the positive refractive power. During zooming from a wide angle end to a telephoto end, the second lens unit L2 and the third lens unit L3 move from the object side to the image side, and the fourth lens unit L4 moves on a locus that is convex toward the object side (moves during zooming), or does not move for zooming. The fifth lens unit L5 does not move for zooming, or moves on a locus that is convex toward the object side (moves during zooming). Focusing is performed by moving the second lens unit L2.

Figure 14:
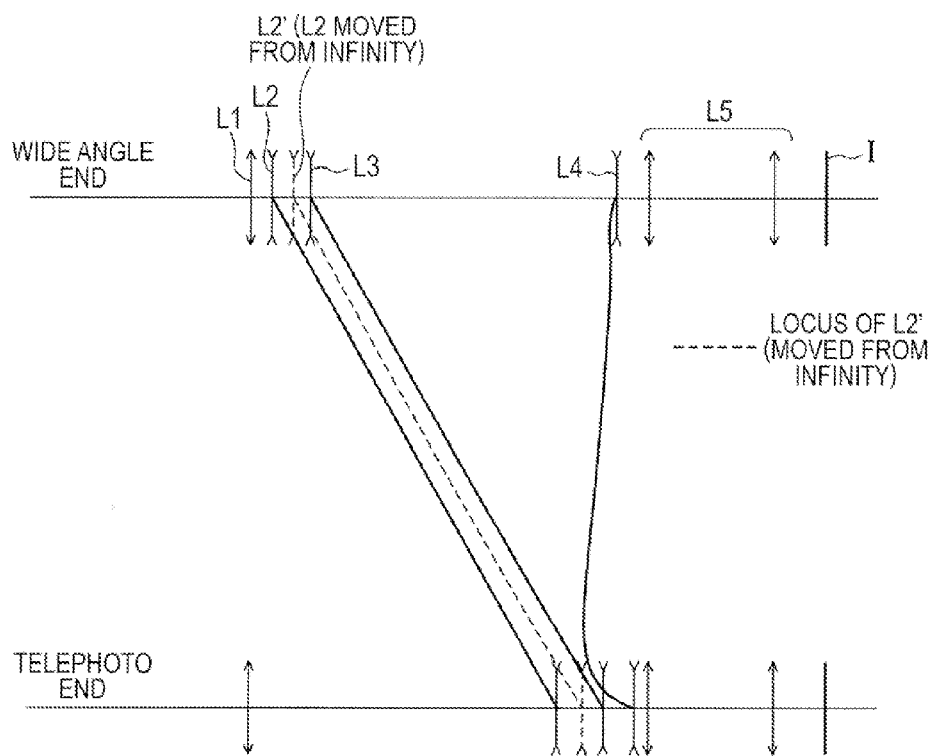
FIG. 14 is a schematic diagram of paraxial arrangement of a zoom lens according to the present invention.

FIG. 14 is a diagram illustrating paraxial arrangement of the zoom lens according to Embodiment 1 (Numerical Embodiment 1) of the present invention, which is described later. The paraxial arrangement in the upper part of the figure corresponds to the wide angle end, and the paraxial arrangement in the lower part of the figure corresponds to the telephoto end. For units that are movable during zooming, loci of movement of the lenses from the wide angle end to the telephoto end are represented by solid lines or broken lines.

The first lens unit having the positive refractive power is denoted by L1, the second lens unit and the third lens unit having the negative refractive power which move during zooming are denoted by L2 and L3, the fourth lens unit having the negative refractive power is denoted by L4, and the fifth lens unit having the positive refractive power is denoted by L5. The second lens unit when focused on a finite distance is denoted by L2'. An image plane is denoted by I and corresponds to an image plane of a solid-state image pickup element of a video camera or the like.

The first lens unit L1 does not move for zooming. The second lens unit L2 and the third lens unit L3 move monotonously on an optical axis toward the image plane side from the wide angle end to the telephoto end, to thereby perform the zooming from the wide angle end to the telephoto end. In addition, the fourth lens unit L4 moves on the locus that is convex toward the object side for correcting an image plane variation accompanying the zooming (moves during zooming). The fifth lens unit L5 does not move for zooming.

The focusing is performed by the second lens unit L2, and the second lens unit at a position when focusing at an arbitrary finite distance (arbitrary distance on a close-up side of infinity) is denoted by L2'. As with the second lens unit L2, the second lens unit L2' also moves monotonously on the optical axis toward the image plane side from the wide angle end to the telephoto end. Under a condition that a zoom ratio is constant, at any zoom ratio, the second lens unit L2 moves in a direction from the object side to the image side during focusing (moves from L2 to L2'). Further, under the condition that the zoom ratio is constant, at any zoom ratio, an amount of movement of the second lens unit L2 during focusing when an object distance has changed from infinity to the finite distance does not change significantly, and takes a minimum value at the wide angle end, at the telephoto end, or in an intermediate region therebetween.

A lateral magnification of the second lens unit L2 at the wide angle end when the object distance is infinity is represented by $\beta 2w$. Moreover, the following conditions are satisfied:

$$-0.95 < 1/\beta 2w < 0.4 \quad (1); \text{and}$$

$$1.2 < f2/f3 < 10 \quad (2),$$

where f2 and f3 represent focal lengths of the second lens unit L2 and the third lens unit L3, respectively.

The second lens unit L2 and the third lens unit L3 are used as lens units for zooming and constituted by lens units having the negative refractive power, and the focusing is performed by moving the second lens unit. The lateral magnification $\beta 2w$ of the second lens unit L2 at the wide angle end when the object distance is infinity, and a ratio of the focal lengths of the second lens unit L2 and the third lens unit L3 are set to appropriate values. This allows the focusing over the entire zoom range while suppressing a reduction in zoom ratio due to the finite distance and suppressing the amount of movement of the second lens unit L2 during focusing.

The zoom lens according to the present invention has the above-mentioned configuration to realize the zoom lens capable of achieving a reduction in size and an increase in magnification, as well as suppression of the reduction in zoom ratio when the object distance is finite, and the image pickup apparatus including the zoom lens.

The conventional four-unit zoom lens for the television camera has a configuration in which, in order to achieve an increase in magnification, a zoom ratio Z2 of the second lens unit having the negative refractive power is high.

The zoom ratio Z2 of the second lens unit is expressed by the following expression:

$$Z2 = \beta 2t/\beta 2w \quad (3),$$

where $\beta 2w$ and $\beta 2t$ are the lateral magnification at the wide angle end and a lateral magnification at the telephoto end of the second lens unit when the object distance is infinity, respectively.

In the four-unit zoom lens, $\beta 2t$ is increased to increase Z2 and achieve the increased magnification.

In the four-unit zoom lens, when the focusing is performed by the fourth lens unit, the zoom ratio Z2 of the second lens unit is reduced significantly when the object distance is the finite distance to reduce the zoom ratio of the entire zoom lens.

To be specific, a lateral magnification $\beta 2t'$ of the second lens unit at the telephoto end when the object distance is finite is expressed by the following expression:

$$\beta 2t' \approx \beta 2t - \beta 2t^2 \times x/f2 \qquad (4),$$

where f2 represents the focal length of the second lens unit, and x represents an amount of change in position of an image point of the first lens unit when the object distance is changed from infinity to the finite distance.

In the conventional four-unit zoom lens in which $\beta 2t$ has a large value, $\beta 2t'$ is reduced significantly in proportion to $\beta 2t^2$ according to Expression (4), and the zoom ratio Z2 of the second lens unit is reduced significantly when the object distance is the finite distance.

In addition, in the conventional four-unit zoom lens in which the focusing is performed by the fourth lens unit, an amount of movement of the fourth lens unit accompanying the focusing is increased in proportion to $\beta 2t^2$. This is because the fourth lens unit is arranged on the image side of the second lens unit.

When $\beta 2t$ is increased in order to achieve the increased magnification, the amount of movement of the fourth lens unit is increased significantly, which makes the reduction in total length difficult.

Note that, the above-mentioned two problems occur in the conventional four-unit zoom lens when the focusing is performed by a unit on the image side of the second lens unit, and are not limited to the case where the fourth lens unit constitutes the focus unit.

In the conventional four-unit zoom lens, when the above-mentioned two problems are to be solved, a method in which the focusing is performed by the second lens unit is effective. This may suppress the reduction in zoom ratio when the object distance is the finite distance due to the reduction in zoom ratio Z2 of the second lens unit, and suppress an increase in amount of movement during the focusing accompanying the increased magnification.

However, in the conventional four-unit zoom lens, at a particular zoom position between the wide angle end and the telephoto end, a lateral magnification $\beta 2$ of the second lens unit takes the following value:

$$\beta 2 = -1 \qquad (5).$$

On the other hand, an amount of movement MV2 during the focusing when the focusing is performed by the second lens unit is expressed by the following expression (6):

$$MV2 \approx \beta 2^2/(1-\beta 2^2) \qquad (6).$$

From Expressions (5) and (6), MV2 becomes infinite at a zoom position where $\beta 2 = -1$.

Therefore, in the conventional four-unit zoom lens, when the focusing is performed by the second lens unit, there occurs a problem in that the focusing cannot be performed at the particular zoom position.

In the present invention, the second lens unit L2 and the third lens unit L3 are used as the lens units for zooming and constituted of the lens units having the negative refractive power, to thereby enable the second lens unit to perform the focusing over the entire range of zooming.

This allows the focusing over the entire zoom range while suppressing the reduction in zoom ratio due to the finite distance and suppressing the amount of movement of the focus unit during the focusing.

Conditional Expression (1) defines the lateral magnification of the second lens unit L2 at the wide angle end when the object distance is infinity. Through setting of the lateral magnification of the second lens unit L2 at the wide angle end when the object distance is infinity in an appropriate range, the second lens unit L2 is enabled to perform the focusing over the entire zoom range. When the lower limit condition of Conditional Expression (1) is not satisfied, the amount of movement of the second lens unit L2 accompanying the focusing is increased at the wide angle end, which makes the reduction in size difficult. When the upper limit condition of Conditional Expression (1) is not satisfied, the amount of movement of the second lens unit L2 accompanying the focusing is increased at the telephoto end, which makes the reduction in size difficult. In addition, the zoom ratio of the second lens unit is reduced, which makes the increase in magnification difficult.

It is more preferred to set Conditional Expression (1) as follows:

$$-0.85 < 1/\beta 2w < 0.25 \qquad (1a).$$

Conditional Expression (2) defines the ratio of the focal lengths of the second lens unit L2 and the third lens unit L3. Through setting of the above-mentioned ratio in an appropriate range, the amount of movement of the second lens unit L2 accompanying the focusing is suppressed over the entire zoom range, and the reduction in size is achieved. When the lower limit condition of Conditional Expression (2) is not satisfied, the amount of movement of the second lens unit L2 accompanying the focusing is increased at the wide angle end, which makes the reduction in size difficult. When the upper limit condition of Conditional Expression (2) is not satisfied, the amount of movement of the second lens unit L2 accompanying the focusing is increased at the telephoto end, which makes the reduction in size difficult.

It is more preferred to set Conditional Expression (2) as follows:

$$1.4 < f2/f3 < 8 \qquad (2a).$$

Through satisfaction of the above-mentioned conditions, the zoom lens having the high magnification and high optical performance over the entire zoom range is obtained.

In the examples, in order to achieve a further increase in magnification and a reduction in size of the entire lens system, it is preferred to satisfy at least one of the following conditions.

The lateral magnification of the second lens unit L2 at the telephoto end when the object distance is infinity is represented by $\beta 2t$, and a lateral magnification at the wide angle end and a lateral magnification at the telephoto end of the third lens unit L3 are represented by $\beta 3w$ and $\beta 3t$, respectively.

Then, it is preferred to satisfy at least one of the following conditions:

$$-0.7 < -\beta 2t/\beta 2w < 3 \qquad (7); \text{ and}$$

$$9 < |\beta 3t/\beta 3w| \qquad (8).$$

Conditional Expression (7) defines a ratio of the lateral magnification at the telephoto end and the lateral magnification at the wide angle end of the second lens unit L2 when the object distance is infinity. When the lower limit condition of Conditional Expression (7) is not satisfied, the zoom ratio of the second lens unit is reduced, which makes the increase in magnification difficult. When the upper limit condition of Conditional Expression (7) is not satisfied, an absolute value of the lateral magnification of the second lens unit L2 at the wide angle end approaches 1 and the amount of movement of the second lens unit L2 accompanying the focusing is increased at the wide angle end, which makes the reduction in size difficult.

It is further preferred to set Conditional Expression (7) as follows:

$$-0.5 < -\beta 2t/\beta 2w < 2.2 \quad (7a).$$

Conditional Expression (8) defines a ratio of the lateral magnification at the telephoto end and the lateral magnification at the wide angle end of the third lens unit L3. When the lower limit condition of Conditional Expression (8) is not satisfied, the zoom ratio of the third lens unit is reduced, which makes the increase in magnification difficult.

It is further preferred to set Conditional Expression (8) as follows:

$$12 < |\beta 3t/\beta 3w| \quad (8a).$$

The second lens unit L2 includes at least two negative lenses and at least one positive lens.

When the number of negative lenses included in the second lens unit L2 is one or less, a curvature and a refractive power of the negative lens are increased, which makes it difficult to correct the aberrations (in particular, spherical aberration and coma) at the telephoto side and variations in aberrations (in particular, spherical aberration and coma) during the focusing.

When no positive lens is included in the second lens unit L2, it becomes difficult to correct the variations in aberrations (in particular, spherical aberration and axial chromatic aberration) during the focusing.

A focal length of the first lens unit L1 is represented by f1, and a combined focal length of the second lens unit L2 and the third lens unit L3 is represented by f23. It is preferred to satisfy the following condition:

$$2 < |f1/f23| < 6 \quad (9).$$

In the expression, f23 is a focal length expressed by the following expression:

$$f23 = \frac{f2 \times f3}{f2 + f3}.$$

Conditional Expression (9) defines a ratio of the focal length f1 of the first lens unit L1 and the combined focal length of the second lens unit L2 and the third lens unit L3. When the lower limit condition of Conditional Expression (9) is not satisfied, refractive powers of the second lens unit L2 and the third lens unit L3 are reduced with respect to a refractive power of the first lens unit L1, which makes it difficult to achieve the increased magnification. When the upper limit condition of Conditional Expression (9) is not satisfied, the refractive powers of the second lens unit L2 and the third lens unit L3 are increased with respect to the refractive power of the first lens unit L1 to increase the variations in aberrations accompanying the zooming, which makes it difficult to attain good optical performance.

It is more preferred to set Conditional Expression (9) as follows:

$$2.5 < |f1/f23| < 5.5 \quad (9a).$$

Next, a lens configuration of the lens units in the embodiments is described.

The first lens unit L1 includes three to six lenses, the second lens unit L2 includes three or four lenses, the third lens unit L3 includes one negative lens, the fourth lens unit L4 includes one negative lens and one positive lens, and the fifth lens unit L5 includes two to twelve lenses as a whole.

Embodiment 1

The zoom lens according to Embodiment 1 of the present invention includes, in order from the object side, a front lens unit (first lens unit L1) having the positive refractive power, a variator (second lens unit L2 and third lens unit L3) having the negative refractive power which move during zooming, a lens unit (fourth lens unit L4) having the negative or positive refractive power, an aperture stop SP, and the fifth lens unit L5 having the positive refractive power which does not move for zooming.

The second lens unit L2 and the third lens unit L3 are moved monotonously on the optical axis to the image plane side to perform the zooming from the wide angle end to the telephoto end. The second lens unit L2 is moved to adjust focus. The fourth lens unit L4 moves on the locus that is convex toward the object side for correcting the image plane variation accompanying the zooming.

Further, in lens cross-sectional views, on the image side of the fifth lens unit L5, a color separation prism, an optical filter, and the like, which are illustrated as a glass block P, and the image plane I are illustrated in order from the object side. The image plane I corresponds to the image plane of the solid-state image pickup element (photoelectric transducer) such as a CCD sensor or a CMOS sensor when using the zoom lens as a photographing optical system of a video camera or a digital still camera. Note that, zoom positions at the wide angle end and at the telephoto end in the following embodiments mean zoom positions at which the lens units for zooming (the second and third lens units L2 and L3 in the embodiments) are positioned at each end of a mechanically movable range on the optical axis.

Figure 1A:
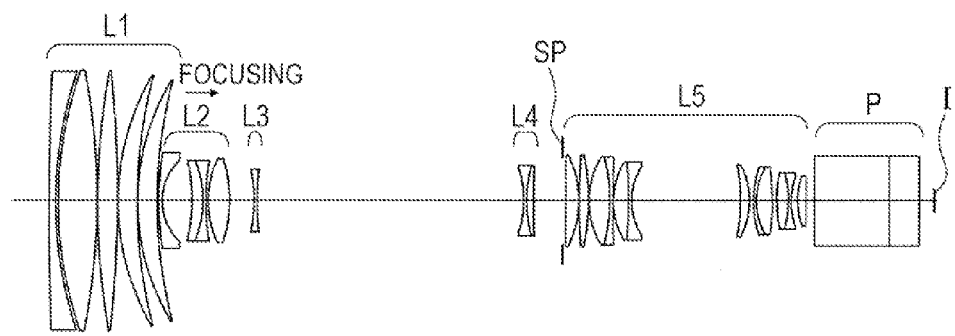
FIG. 1A is a lens cross-sectional view at a wide angle end according to Numerical Embodiment 1.
Figure 1B:
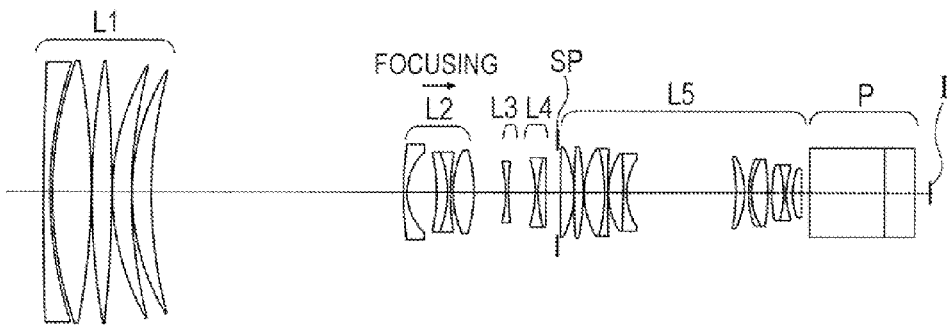
FIG. 1B is a lens cross-sectional view at a telephoto end according to Numerical Embodiment 1.

FIGS. 1A and 1B are lens cross-sectional views of the zoom lens according to Embodiment 1 of the present invention at the wide angle end (short focal length end) and the telephoto end (long focal length end), respectively. FIGS. 2A and 2B are aberration diagrams of the zoom lens according to Embodiment 1 at the wide angle end and the telephoto end when the object distance is infinity, respectively. Embodiment 1 is directed to the zoom lens having the high magnification and a large aperture with a zoom ratio of 40.0 and an F-number at the wide angle end of 2.1.

The zoom lens of each embodiment is a photographing lens system used in the image pickup apparatus, and in the lens cross-sectional views, the left side is the subject side (front side) and the right side is the image side (back side).

In each aberration diagram, e, g, and C represent an e-line, a g-line, and a C-line, respectively, and M and S represent a meridional image plane and a sagittal image plane, respectively. A lateral chromatic aberration is illustrated by the g-line and the C-line. Fno represents an F-number, and ω represents a half angle of field. The same description is applied to aberration diagrams of Embodiments 2 to 6.

Numerical data corresponding to Embodiment 1 of the present invention is shown below as Numerical Embodiment 1. In numerical embodiments, "i" represents the order of a surface from the object side, "ri" represents a radius of curvature of an i-th surface from the object side, "di" represents an interval between the i-th surface and the (i+1)th surface from the object side, and "ndi" and "υdi" respectively represent a refractive index and an Abbe constant of the i-th optical material. The focal length, the F-number, and the half angle of field respectively represent values obtained when focusing on an infinitely-distant object. BF represents a length from a final surface to the image plane. The final three or two surfaces are surfaces of a plate including a glass block such as a filter. The aspherical shape is expressed by the following expression:

$$X = \frac{(1/R)H^2}{1 + \sqrt{1 - (1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12}$$

where an X axis corresponds to the optical axis, an H axis corresponds to an axis perpendicular to the optical axis, a traveling direction of light corresponds to a positive direction, "R" represents a paraxial curvature radius, "K" represents a conic constant, and "A3" to "A12" each represent an aspherical coefficient. Further, for example, "e-Z" means "×10$^{-Z}$". Note that, the same description is also applied to the following numerical embodiments.

Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 1

Unit mm

Surface data

| Surface number | r | d | nd | vd | Effective diameter |
|---|---|---|---|---|---|
| 1 | 1614.345 | 3.00 | 1.80440 | 39.6 | 115.79 |
| 2 | 189.919 | 1.07 | | | 115.44 |
| 3 | 181.654 | 17.84 | 1.43387 | 95.1 | 116.24 |
| 4 | −315.447 | 0.20 | | | 116.57 |
| 5 | 341.230 | 9.22 | 1.43387 | 95.1 | 116.59 |
| 6 | −566.191 | 0.20 | | | 116.47 |
| 7 | 115.284 | 8.76 | 1.43387 | 95.1 | 112.19 |
| 8 | 228.724 | 0.20 | | | 111.64 |
| 9 | 107.919 | 8.89 | 1.43387 | 95.1 | 107.88 |
| 10 | 218.886 | (Variable) | | | 107.13 |
| 11* | 128.744 | 1.69 | 1.83481 | 42.7 | 42.84 |
| 12 | 25.659 | 13.61 | | | 35.94 |
| 13 | −83.336 | 5.13 | 1.92286 | 18.9 | 35.02 |
| 14 | −47.489 | 1.23 | 1.83481 | 42.7 | 35.38 |
| 15 | 112.199 | 1.09 | | | 35.78 |
| 16 | 45.321 | 9.80 | 1.69895 | 30.1 | 37.26 |
| 17 | −63.196 | (Variable) | | | 36.80 |
| 18 | −63.310 | 1.23 | 1.88300 | 40.8 | 27.15 |
| 19 | 109.763 | (Variable) | | | 26.59 |
| 20 | −45.774 | 1.30 | 1.71700 | 47.9 | 28.36 |
| 21 | 60.123 | 3.29 | 1.84666 | 23.8 | 30.40 |
| 22 | 534.038 | (Variable) | | | 30.86 |
| 23 | ∞ | 1.52 | | | 39.03 |
| 24 | — | 6.08 | 1.60738 | 56.8 | 39.99 |
| 25 | −47.044 | 0.15 | | | 40.56 |
| 26 | 328.658 | 4.05 | 1.51823 | 58.9 | 40.82 |
| 27 | −110.234 | 0.35 | | | 40.81 |
| 28 | 39.338 | 9.49 | 1.48749 | 70.2 | 39.19 |
| 29 | −81.883 | 1.50 | 1.83400 | 37.2 | 38.18 |
| 30 | 516.358 | 0.15 | | | 36.94 |
| 31 | 34.012 | 7.02 | 1.48749 | 70.2 | 34.64 |
| 32 | −307.813 | 1.50 | 1.88300 | 40.8 | 33.32 |
| 33 | 29.300 | 50.00 | | | 30.12 |
| 34 | −83.437 | 3.98 | 1.50127 | 56.5 | 31.66 |
| 35 | −35.561 | 1.91 | | | 31.92 |
| 36 | 47.366 | 1.20 | 1.78590 | 44.2 | 29.61 |
| 37 | 29.437 | 7.53 | 1.51742 | 52.4 | 28.49 |
| 38 | −92.814 | 2.01 | | | 27.53 |
| 39 | 66.344 | 5.32 | 1.51742 | 52.4 | 24.53 |
| 40 | −45.467 | 1.20 | 1.83481 | 42.7 | 22.92 |
| 41 | 33.806 | 2.95 | | | 21.26 |
| 42 | 33.007 | 3.91 | 1.50127 | 56.5 | 21.52 |
| 43 | −2218.082 | 3.80 | | | 21.19 |
| 44 | ∞ | 34.37 | 1.60859 | 46.4 | 40.00 |
| 45 | ∞ | 13.75 | 1.51680 | 64.2 | 40.00 |
| 46 | ∞ | (Variable) | | | 40.00 |
| Image | ∞ | | | | |

Aspherical surface data

Eleventh surface

K = 2.35214e+001 A 4 = −2.29613e−006 A 6 = −1.75959e−009
A 8 = −4.17467e−014 A10 = −4.16561e−015

Various data
Zoom ratio 40.00

| Focal length | 11.00 | 440.00 |
|---|---|---|
| F-number | 2.10 | 3.80 |
| Half angle of field | 26.56 | 0.72 |
| Image height | 5.50 | 5.50 |
| Total lens length | 406.29 | 406.29 |
| BF | 7.23 | 7.23 |
| d10 | 0.69 | 115.35 |
| d17 | 11.26 | 14.36 |
| d19 | 122.47 | 12.38 |
| d22 | 13.14 | 5.48 |
| d46 | 7.23 | 7.23 |
| Incident pupil position | 78.21 | 2548.63 |
| Exit pupil position | 5357.09 | 5357.09 |
| Front principal point position | 89.23 | 3024.81 |
| Rear principal point position | −3.77 | −432.77 |

Zoom lens unit data

| Unit | First surface | Focal length | Lens structure length | Front principal point position | Rear principal point position |
|---|---|---|---|---|---|
| 1 | 1 | 161.84 | 49.39 | 21.50 | −12.28 |
| 2 | 11 | −150.00 | 32.55 | −45.39 | −102.34 |
| 3 | 18 | −45.06 | 1.23 | 0.24 | −0.41 |
| 4 | 20 | −66.06 | 4.59 | 0.16 | −2.36 |
| 5 | 23 | 81.58 | 163.74 | 82.80 | −178.43 |

Closest object distance

| Distance from first surface of lens | 3000 |
|---|---|

Single Lens data

| Lens | First surface | Focal length |
|---|---|---|
| 1 | 1 | −266.24 |
| 2 | 3 | 267.93 |
| 3 | 5 | 491.01 |
| 4 | 7 | 522.17 |
| 5 | 9 | 477.80 |
| 6 | 11 | −38.46 |
| 7 | 13 | 110.52 |
| 8 | 14 | −39.61 |
| 9 | 16 | 38.92 |
| 10 | 18 | −45.06 |
| 11 | 20 | −35.88 |
| 12 | 21 | 78.98 |
| 13 | 24 | 77.33 |
| 14 | 26 | 159.15 |
| 15 | 28 | 55.76 |
| 16 | 29 | −84.11 |
| 17 | 31 | 63.04 |
| 18 | 32 | −30.06 |
| 19 | 34 | 119.78 |

-continued

Unit mm

| | | |
|---|---|---|
| 20 | 36 | −101.42 |
| 21 | 37 | 43.92 |
| 22 | 39 | 52.76 |
| 23 | 40 | −22.94 |
| 24 | 42 | 64.65 |
| 25 | 44 | 0.00 |
| 26 | 45 | 0.00 |

Embodiment 2

The zoom lens according to Embodiment 2 also has a configuration similar to that of the zoom lens according to Embodiment 1.

Figure 3A:
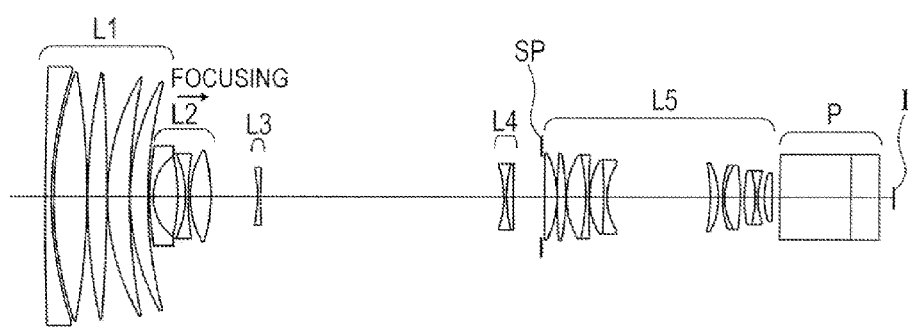
FIG. 3A is a lens cross-sectional view at the wide angle end according to Numerical Embodiment 2.
Figure 3B:
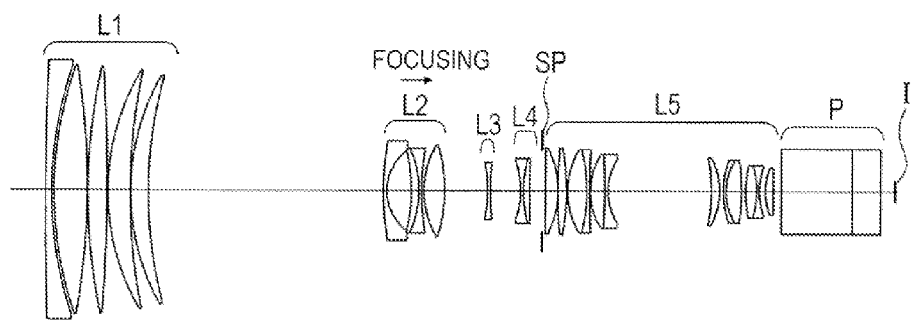
FIG. 3B is a lens cross-sectional view at the telephoto end according to Numerical Embodiment 2.
Figure 4A:
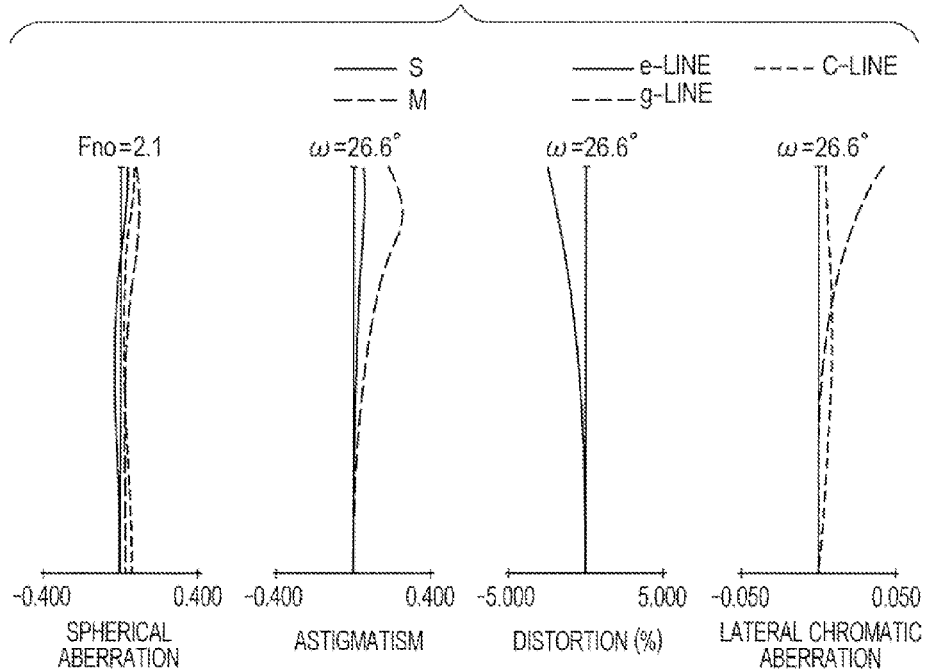
FIG. 4A is an aberration diagram at the wide angle end when the object distance is infinity according to Numerical Embodiment 2.
Figure 4B:
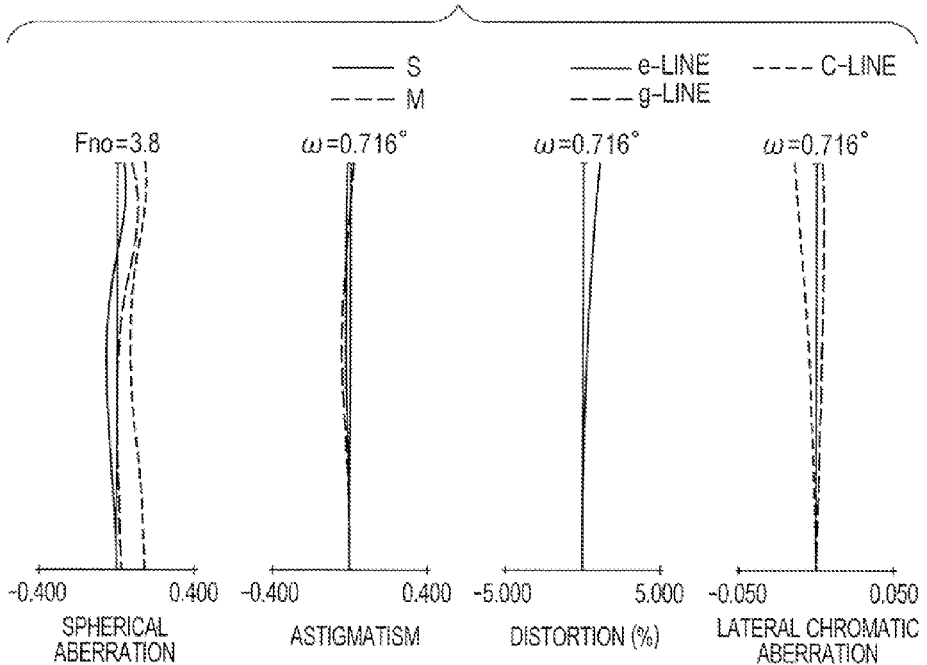
FIG. 4B is an aberration diagram at the telephoto end when the object distance is infinity according to Numerical Embodiment 2.

FIGS. 3A and 3B are lens cross-sectional views of the zoom lens according to Embodiment 2 of the present invention at the wide angle end and the telephoto end, respectively. FIGS. 4A and 4B are aberration diagrams of the zoom lens according to Embodiment 2 of the present invention at the wide angle end and the telephoto end when the object distance is infinity, respectively. Embodiment 2 is directed to the zoom lens having the high magnification and the large aperture with a zoom ratio of 40.0 and an F-number at the wide angle end of 2.1.

Numerical data corresponding to Embodiment 2 is shown below as Numerical Embodiment 2. Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 2

Unit mm

Surface data

| Surface number | r | d | nd | vd | Effective diameter |
|---|---|---|---|---|---|
| 1 | 1779.930 | 3.00 | 1.80440 | 39.6 | 121.70 |
| 2 | 191.942 | 1.07 | | | 117.90 |
| 3 | 183.596 | 16.18 | 1.43387 | 95.1 | 117.76 |
| 4 | −350.575 | 0.20 | | | 117.35 |
| 5 | 283.758 | 9.42 | 1.43387 | 95.1 | 116.73 |
| 6 | −794.371 | 0.20 | | | 116.60 |
| 7 | 114.771 | 10.78 | 1.43387 | 95.1 | 112.73 |
| 8 | 292.021 | 0.20 | | | 112.05 |
| 9 | 113.792 | 8.55 | 1.43387 | 95.1 | 107.67 |
| 10 | 210.765 | (Variable) | | | 106.41 |
| 11* | 123.902 | 1.69 | 1.83481 | 42.7 | 46.88 |
| 12 | 24.864 | 11.91 | | | 38.33 |
| 13 | −83.627 | 3.77 | 1.92286 | 18.9 | 38.30 |
| 14 | −48.419 | 1.23 | 1.83481 | 42.7 | 38.71 |
| 15 | 125.405 | 1.09 | | | 39.90 |
| 16 | 44.881 | 9.99 | 1.69895 | 30.1 | 43.05 |
| 17 | −78.792 | (Variable) | | | 42.86 |
| 18 | −63.184 | 1.23 | 1.88300 | 40.8 | 26.52 |
| 19 | 153.511 | (Variable) | | | 26.12 |
| 20 | −45.666 | 1.30 | 1.71700 | 47.9 | 28.07 |
| 21 | 60.770 | 3.24 | 1.84666 | 23.8 | 30.07 |
| 22 | 554.474 | (Variable) | | | 30.54 |
| 23 | ∞ | 1.52 | | | 39.01 |
| 24 | — | 6.08 | 1.60738 | 56.8 | 39.97 |
| 25 | −47.044 | 0.15 | | | 40.54 |
| 26 | 328.658 | 4.05 | 1.51823 | 58.9 | 40.79 |
| 27 | −110.234 | 0.35 | | | 40.78 |
| 28 | 39.338 | 9.49 | 1.48749 | 70.2 | 39.16 |
| 29 | −81.883 | 1.50 | 1.83400 | 37.2 | 38.14 |
| 30 | 516.358 | 0.15 | | | 36.90 |
| 31 | 34.012 | 7.02 | 1.48749 | 70.2 | 34.60 |
| 32 | −307.813 | 1.50 | 1.88300 | 40.8 | 33.28 |
| 33 | 29.300 | 50.00 | | | 30.08 |
| 34 | −83.437 | 3.98 | 1.50127 | 56.5 | 31.53 |
| 35 | −35.561 | 1.91 | | | 31.79 |
| 36 | 47.366 | 1.20 | 1.78590 | 44.2 | 29.49 |
| 37 | 29.437 | 7.53 | 1.51742 | 52.4 | 28.37 |
| 38 | −92.814 | 2.01 | | | 27.40 |
| 39 | 66.344 | 5.32 | 1.51742 | 52.4 | 24.43 |
| 40 | −45.467 | 1.20 | 1.83481 | 42.7 | 22.81 |
| 41 | 33.806 | 2.95 | | | 21.61 |
| 42 | 33.007 | 3.91 | 1.50127 | 56.5 | 21.92 |
| 43 | −2218.082 | 3.80 | | | 21.59 |
| 44 | ∞ | 34.37 | 1.60859 | 46.4 | 40.00 |
| 45 | ∞ | 13.75 | 1.51680 | 64.2 | 40.00 |
| 46 | ∞ | (Variable) | | | 40.00 |
| Image | ∞ | | | | |

Aspherical surface data

Eleventh surface

K = 1.89787e+001 A 4 = −1.62363e−006 A 6 = −2.44138e−009
A 8 = 1.84034e−012 A10 = −4.16561e−015

Various data
Zoom ratio 40.00

| | | |
|---|---|---|
| Focal length | 11.00 | 440.00 |
| F-number | 2.10 | 3.80 |
| Half angle of field | 26.56 | 0.72 |
| Image height | 5.50 | 5.50 |
| Total lens length | 410.74 | 410.74 |
| BF | 6.99 | 6.99 |
| d10 | 0.90 | 113.63 |
| d17 | 22.59 | 20.80 |
| d19 | 117.82 | 14.59 |
| d22 | 13.65 | 5.95 |
| d46 | 6.99 | 6.99 |
| Incident pupil position | 83.00 | 2772.53 |
| Exit pupil position | 5357.09 | 5357.09 |
| Front principal point position | 94.02 | 3248.72 |
| Rear principal point position | −4.01 | −433.00 |

Zoom lens unit data

| Unit | First surface | Focal length | Lens structure length | Front principal point position | Rear principal point position |
|---|---|---|---|---|---|
| 1 | 1 | 161.84 | 49.59 | 20.42 | −13.54 |
| 2 | 11 | −93.96 | 29.68 | −21.49 | −58.16 |
| 3 | 18 | −50.26 | 1.23 | 0.19 | −0.46 |
| 4 | 20 | −66.06 | 4.54 | 0.14 | −2.35 |
| 5 | 23 | 81.58 | 163.74 | 82.80 | −178.43 |

Closest object distance

| | |
|---|---|
| Distance from first surface of lens | 3000 |

Single Lens data

| Lens | First surface | Focal length |
|---|---|---|
| 1 | 1 | −266.09 |
| 2 | 3 | 279.59 |
| 3 | 5 | 481.95 |
| 4 | 7 | 426.86 |
| 5 | 9 | 553.80 |
| 6 | 11 | −37.35 |
| 7 | 13 | 117.04 |
| 8 | 14 | −41.08 |
| 9 | 16 | 41.99 |
| 10 | 18 | −50.26 |
| 11 | 20 | −36.00 |
| 12 | 21 | 79.58 |

-continued

| Unit mm | | |
|---|---|---|
| 13 | 24 | 77.33 |
| 14 | 26 | 159.15 |
| 15 | 28 | 55.76 |
| 16 | 29 | -84.11 |
| 17 | 31 | 63.04 |
| 18 | 32 | -30.06 |
| 19 | 34 | 119.78 |
| 20 | 36 | -101.42 |
| 21 | 37 | 43.92 |
| 22 | 39 | 52.76 |
| 23 | 40 | -22.94 |
| 24 | 42 | 64.65 |
| 25 | 44 | 0.00 |
| 26 | 45 | 0.00 |

Embodiment 3

The zoom lens according to Embodiment 3 also has a configuration similar to that of the zoom lens according to Embodiment 1.

Figure 5A:
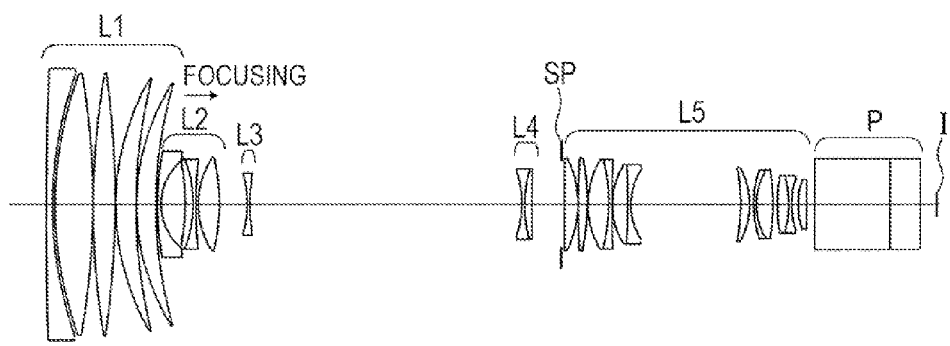
FIG. 5A is a lens cross-sectional view at the wide angle end according to Numerical Embodiment 3.
Figure 5B:
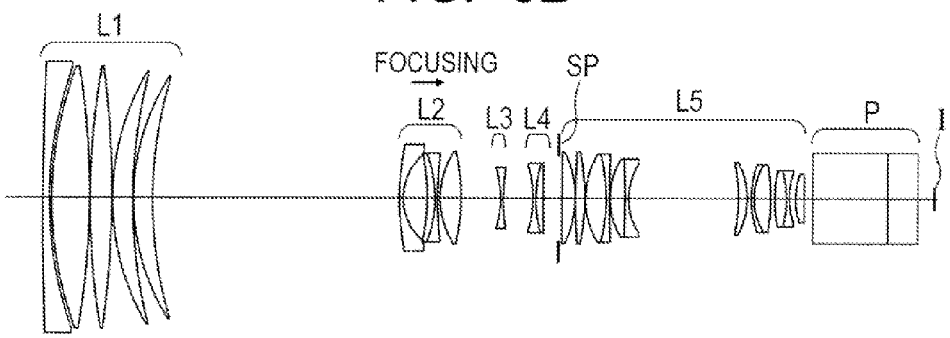
FIG. 5B is a lens cross-sectional view at the telephoto end according to Numerical Embodiment 3.
Figure 6A:
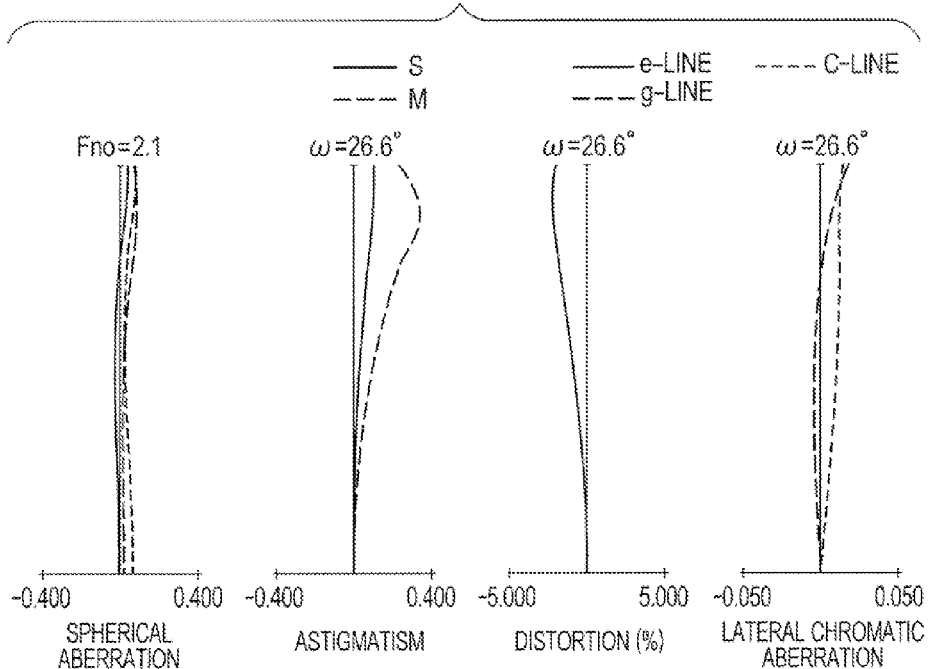
FIG. 6A is an aberration diagram at the wide angle end when the object distance is infinity according to Numerical Embodiment 3.
Figure 6B:
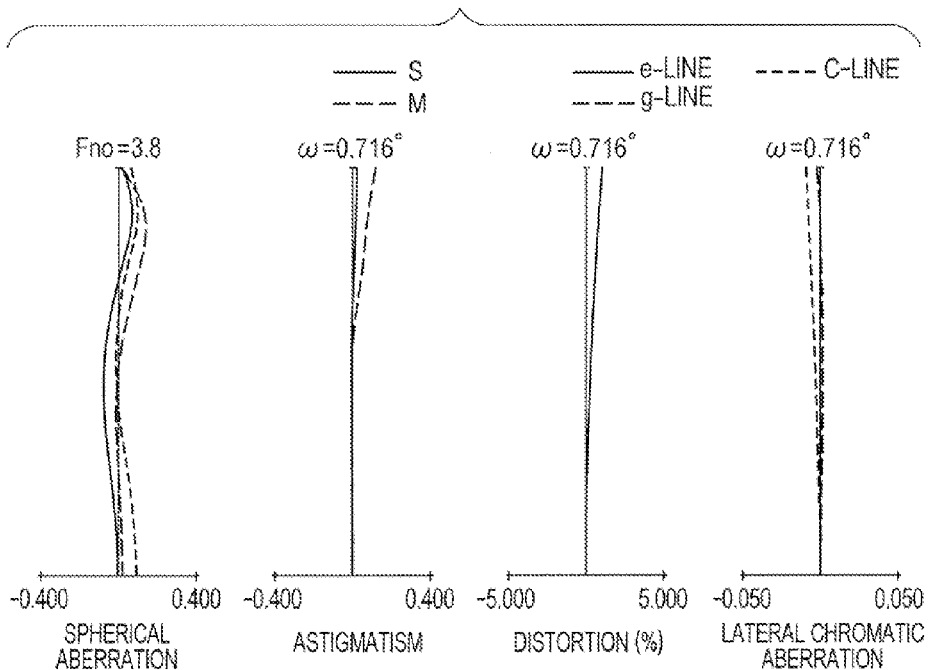
FIG. 6B is an aberration diagram at the telephoto end when the object distance is infinity according to Numerical Embodiment 3.

FIGS. 5A and 5B are lens cross-sectional views of the zoom lens according to Embodiment 3 of the present invention at the wide angle end and the telephoto end, respectively. FIGS. 6A and 6B are aberration diagrams of the zoom lens according to Embodiment 3 of the present invention at the wide angle end and the telephoto end when the object distance is infinity, respectively. Embodiment 3 is directed to the zoom lens having the high magnification and the large aperture with a zoom ratio of 40.0 and an F-number at the wide angle end of 2.1.

Numerical data corresponding to Embodiment 3 is shown below as Numerical Embodiment 3. Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 3

| Unit mm | | | | |
|---|---|---|---|---|
| Surface data | | | | |
| Surface number | r | d | nd | vd | Effective diameter |
| 1 | 1641.348 | 3.00 | 1.80440 | 39.6 | 120.15 |
| 2 | 179.705 | 1.07 | | | 116.24 |
| 3 | 172.259 | 17.18 | 1.43387 | 95.1 | 116.31 |
| 4 | -355.665 | 0.20 | | | 116.60 |
| 5 | 360.051 | 9.99 | 1.43387 | 95.1 | 116.96 |
| 6 | -428.738 | 0.20 | | | 116.87 |
| 7 | 114.819 | 9.30 | 1.43387 | 95.1 | 112.53 |
| 8 | 242.201 | 0.20 | | | 111.98 |
| 9 | 103.892 | 8.79 | 1.43387 | 95.1 | 107.71 |
| 10 | 198.173 | (Variable) | | | 106.95 |
| 11* | 118.682 | 1.69 | 1.83481 | 42.7 | 47.30 |
| 12 | 26.183 | 10.93 | | | 39.02 |
| 13 | -100.506 | 3.68 | 1.92286 | 18.9 | 38.96 |
| 14 | -55.018 | 1.23 | 1.83481 | 42.7 | 39.13 |
| 15 | 187.514 | 1.09 | | | 39.45 |
| 16 | 39.361 | 9.62 | 1.69895 | 30.1 | 41.10 |
| 17 | -91.569 | (Variable) | | | 40.57 |
| 18 | -49.464 | 1.23 | 1.88300 | 40.8 | 26.87 |
| 19 | 84.730 | (Variable) | | | 26.07 |
| 20 | -45.982 | 1.30 | 1.71700 | 47.9 | 28.19 |
| 21 | 59.690 | 3.27 | 1.84666 | 23.8 | 30.21 |
| 22 | 507.133 | (Variable) | | | 30.68 |
| 23 | ∞ | 1.52 | | | 39.03 |
| 24 | — | 6.08 | 1.60738 | 56.8 | 39.99 |
| 25 | -47.044 | 0.15 | | | 40.56 |
| 26 | 328.658 | 4.05 | 1.51823 | 58.9 | 40.83 |
| 27 | -110.234 | 0.35 | | | 40.82 |
| 28 | 39.338 | 9.49 | 1.48749 | 70.2 | 39.22 |
| 29 | -81.883 | 1.50 | 1.83400 | 37.2 | 38.21 |
| 30 | 516.358 | 0.15 | | | 36.98 |
| 31 | 34.012 | 7.02 | 1.48749 | 70.2 | 34.67 |
| 32 | -307.813 | 1.50 | 1.88300 | 40.8 | 33.37 |
| 33 | 29.300 | 50.00 | | | 30.17 |
| 34 | -83.437 | 3.98 | 1.50127 | 56.5 | 31.83 |
| 35 | -35.561 | 1.91 | | | 32.09 |
| 36 | 47.366 | 1.20 | 1.78590 | 44.2 | 29.77 |
| 37 | 29.437 | 7.53 | 1.51742 | 52.4 | 28.64 |
| 38 | -92.814 | 2.01 | | | 27.70 |
| 39 | 66.344 | 5.32 | 1.51742 | 52.4 | 24.68 |
| 40 | -45.467 | 1.20 | 1.83481 | 42.7 | 23.08 |
| 41 | 33.806 | 2.95 | | | 21.40 |
| 42 | 33.007 | 3.91 | 1.50127 | 56.5 | 21.16 |
| 43 | -2218.082 | 3.80 | | | 20.84 |
| 44 | ∞ | 34.37 | 1.60859 | 46.4 | 40.00 |
| 45 | ∞ | 13.75 | 1.51680 | 64.2 | 40.00 |
| 46 | ∞ | (Variable) | | | 40.00 |
| Image | ∞ | | | | |

Aspherical surface data

Eleventh surface

K = 1.70029e+001 A 4 = -1.63451e-006 A 6 = -2.15834e-009
A 8 = 2.00694e-012 A10 = -4.16561e-015

Various data
Zoom ratio 40.00

| Focal length | 11.00 | 440.00 |
|---|---|---|
| F-number | 2.10 | 3.80 |
| Half angle of field | 26.57 | 0.72 |
| Image height | 5.50 | 5.50 |
| Total lens length | 405.89 | 405.89 |
| BF | 7.53 | 7.53 |
| d10 | 0.71 | 112.16 |
| d17 | 12.68 | 17.82 |
| d19 | 123.84 | 13.60 |
| d22 | 13.40 | 7.06 |
| d46 | 7.53 | 7.53 |
| Incident pupil position | 82.41 | 2539.41 |
| Exit pupil position | 5357.09 | 5357.09 |
| Front principal point position | 93.43 | 3015.60 |
| Rear principal point position | -3.46 | -432.46 |

Zoom lens unit data

| Unit | First surface | Focal length | Lens structure length | Front principal point position | Rear principal point position |
|---|---|---|---|---|---|
| 1 | 1 | 161.84 | 49.94 | 21.87 | -12.22 |
| 2 | 11 | -262.76 | 28.24 | -71.60 | -127.85 |
| 3 | 18 | -35.01 | 1.23 | 0.24 | -0.41 |
| 4 | 20 | -66.06 | 4.57 | 0.17 | -2.34 |
| 5 | 23 | 81.58 | 163.74 | 82.80 | -178.43 |

Closest object distance

| Distance from first surface of lens | 3000 |
|---|---|

Single Lens data

| Lens | First surface | Focal length |
|---|---|---|
| 1 | 1 | -249.60 |
| 2 | 3 | 269.47 |
| 3 | 5 | 451.66 |
| 4 | 7 | 491.05 |
| 5 | 9 | 488.25 |

-continued

Unit mm

| | | |
|---|---|---|
| 6 | 11 | −40.36 |
| 7 | 13 | 125.21 |
| 8 | 14 | −50.56 |
| 9 | 16 | 40.30 |
| 10 | 18 | −35.01 |
| 11 | 20 | −35.86 |
| 12 | 21 | 78.86 |
| 13 | 24 | 77.33 |
| 14 | 26 | 159.15 |
| 15 | 28 | 55.76 |
| 16 | 29 | −84.11 |
| 17 | 31 | 63.04 |
| 18 | 32 | −30.06 |
| 19 | 34 | 119.78 |
| 20 | 36 | −101.42 |
| 21 | 37 | 43.92 |
| 22 | 39 | 52.76 |
| 23 | 40 | −22.94 |
| 24 | 42 | 64.65 |
| 25 | 44 | 0.00 |
| 26 | 45 | 0.00 |

Embodiment 4

The zoom lens according to Embodiment 4 also has a configuration similar to that of the zoom lens according to Embodiment 1.

Figure 7A:
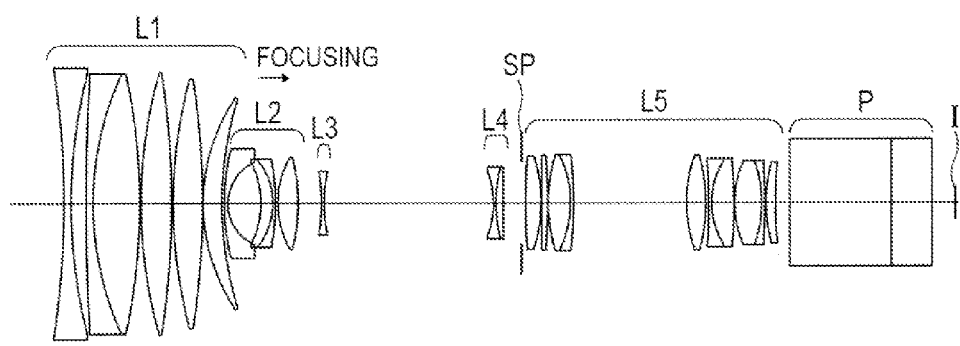
FIG. 7A is a lens cross-sectional view at the wide angle end according to Numerical Embodiment 4.
Figure 7B:
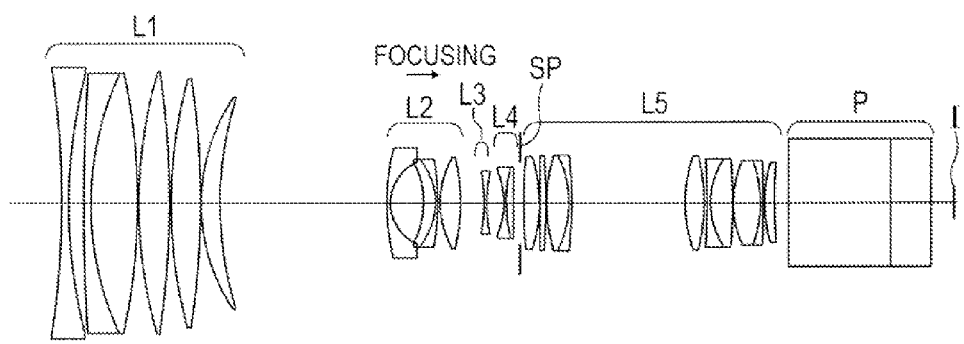
FIG. 7B is a lens cross-sectional view at the telephoto end according to Numerical Embodiment 4.

FIGS. 7A and 7B are lens cross-sectional views of the zoom lens according to Embodiment 4 of the present invention at the wide angle end and the telephoto end, respectively. FIGS. 8A and 8B are aberration diagrams of the zoom lens according to Embodiment 4 of the present invention at the wide angle end and the telephoto end when the object distance is infinity, respectively. Embodiment 4 is directed to the zoom lens having the high magnification and the large aperture with a zoom ratio of 21.0 and an F-number at the wide angle end of 1.9.

Numerical data corresponding to Embodiment 4 is shown below as Numerical Embodiment 4. Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 4

Unit mm

Surface data

| Surface number | r | d | nd | vd | Effective diameter |
|---|---|---|---|---|---|
| 1 | −291.857 | 2.30 | 1.80100 | 35.0 | 84.97 |
| 2 | 172.252 | 4.82 | | | 80.87 |
| 3 | 691.619 | 2.30 | 1.72825 | 28.5 | 80.97 |
| 4 | 101.378 | 15.09 | 1.43875 | 94.9 | 80.97 |
| 5 | −199.830 | 0.40 | | | 81.42 |
| 6 | 155.329 | 9.88 | 1.45600 | 90.3 | 82.23 |
| 7 | −284.296 | 0.54 | | | 82.08 |
| 8 | 156.793 | 9.53 | 1.72916 | 54.7 | 79.40 |
| 9 | −264.653 | 0.15 | | | 78.82 |
| 10 | 62.293 | 6.12 | 1.77250 | 49.6 | 67.27 |
| 11 | 117.871 | (Variable) | | | 66.45 |
| 12* | 83.778 | 1.10 | 1.83481 | 42.7 | 34.13 |
| 13 | 14.569 | 10.71 | | | 25.28 |
| 14 | −28.676 | 3.90 | 1.92286 | 18.9 | 25.17 |
| 15 | −21.883 | 0.80 | 1.83481 | 42.7 | 26.03 |
| 16 | −75.104 | 0.71 | | | 27.13 |
| 17 | 29.869 | 6.65 | 1.69895 | 30.1 | 28.34 |
| 18 | −59.791 | (Variable) | | | 27.90 |
| 19 | −53.140 | 0.80 | 1.88300 | 40.8 | 19.41 |
| 20 | 49.203 | (Variable) | | | 19.23 |
| 21 | −28.427 | 0.75 | 1.74320 | 49.3 | 19.86 |
| 22 | 45.502 | 2.41 | 1.84666 | 23.8 | 21.59 |
| 23 | −1121.394 | (Variable) | | | 22.00 |
| 24 | ∞ | 1.30 | | | 26.44 |
| 25 | 193.302 | 5.02 | 1.67003 | 47.2 | 27.76 |
| 26 | −48.648 | 0.15 | | | 28.60 |
| 27 | −1546.554 | 2.00 | 1.56732 | 42.8 | 29.02 |
| 28 | −193.197 | 0.15 | | | 29.21 |
| 29 | 52.351 | 7.18 | 1.48749 | 70.2 | 29.53 |
| 30 | −35.189 | 1.00 | 1.88300 | 40.8 | 29.32 |
| 31 | −127.497 | 36.60 | | | 29.66 |
| 32 | 44.582 | 6.25 | 1.48749 | 70.2 | 29.10 |
| 33 | −57.976 | 0.91 | | | 28.63 |
| 34 | −203.971 | 1.00 | 1.88300 | 40.8 | 27.18 |
| 35 | 25.675 | 7.21 | 1.48749 | 70.2 | 25.88 |
| 36 | −158.827 | 0.15 | | | 25.79 |
| 37 | 32.650 | 8.82 | 1.48749 | 70.2 | 25.90 |
| 38 | −39.316 | 1.00 | 1.88300 | 40.8 | 25.08 |
| 39 | −274.040 | 0.34 | | | 25.05 |
| 40 | 47.813 | 3.24 | 1.57501 | 41.5 | 24.81 |
| 41 | 161.118 | 4.50 | | | 24.27 |
| 42 | ∞ | 33.00 | 1.60859 | 46.4 | 40.00 |
| 43 | ∞ | 13.20 | 1.51633 | 64.1 | 40.00 |
| 44 | ∞ | (Variable) | | | 40.00 |
| Image | ∞ | | | | |

Aspherical surface data

Twelfth surface

K = 1.82549e+001 A 4 = 1.79379e−006 A 6 = −2.61490e−008
A 8 = 6.53743e−011 A10 = −1.98244e−013

Various data
Zoom ratio 21.00

| | | |
|---|---|---|
| Focal length | 7.90 | 165.90 |
| F-number | 1.90 | 2.70 |
| Half angle of field | 34.85 | 1.90 |
| Image height | 5.50 | 5.50 |
| Total lens length | 288.56 | 288.56 |
| BF | 7.50 | 7.50 |
| d11 | 0.75 | 53.93 |
| d18 | 7.60 | 7.60 |
| d20 | 54.82 | 5.47 |
| d23 | 5.91 | 2.08 |
| d44 | 7.50 | 7.50 |
| Incident pupil position | 48.89 | 635.81 |
| Exit pupil position | 1103.96 | 1103.96 |
| Front principal point position | 56.85 | 826.82 |
| Rear principal point position | −0.40 | −158.40 |

Zoom lens unit data

| Unit | First surface | Focal length | Lens structure length | Front principal point position | Rear principal point position |
|---|---|---|---|---|---|
| 1 | 1 | 69.86 | 51.14 | 33.55 | 5.42 |
| 2 | 12 | −193.78 | 23.86 | −81.04 | −172.12 |
| 3 | 19 | −28.66 | 0.80 | 0.22 | −0.20 |
| 4 | 21 | −43.35 | 3.16 | −0.10 | −1.83 |
| 5 | 24 | 51.82 | 133.02 | 54.13 | −113.62 |

Closest object distance

| Distance from first surface of lens | 1000 |
|---|---|

Single Lens data

| Lens | First surface | Focal length |
|---|---|---|

-continued

Unit mm

| | | |
|---|---|---|
| 1 | 1 | −134.03 |
| 2 | 3 | −162.04 |
| 3 | 4 | 155.28 |
| 4 | 6 | 221.26 |
| 5 | 8 | 135.75 |
| 6 | 10 | 162.39 |
| 7 | 12 | −21.16 |
| 8 | 14 | 77.41 |
| 9 | 15 | −37.04 |
| 10 | 17 | 29.17 |
| 11 | 19 | −28.66 |
| 12 | 21 | −23.33 |
| 13 | 22 | 51.19 |
| 14 | 25 | 58.20 |
| 15 | 27 | 386.80 |
| 16 | 29 | 44.21 |
| 17 | 30 | −55.00 |
| 18 | 32 | 52.58 |
| 19 | 34 | −25.62 |
| 20 | 35 | 45.77 |
| 21 | 37 | 38.00 |
| 22 | 38 | −51.79 |
| 23 | 40 | 116.35 |
| 24 | 42 | 0.00 |
| 25 | 43 | 0.00 |

Embodiment 5

The zoom lens according to Embodiment 5 also has a configuration similar to that of the zoom lens according to Embodiment 1.

Figure 9A:
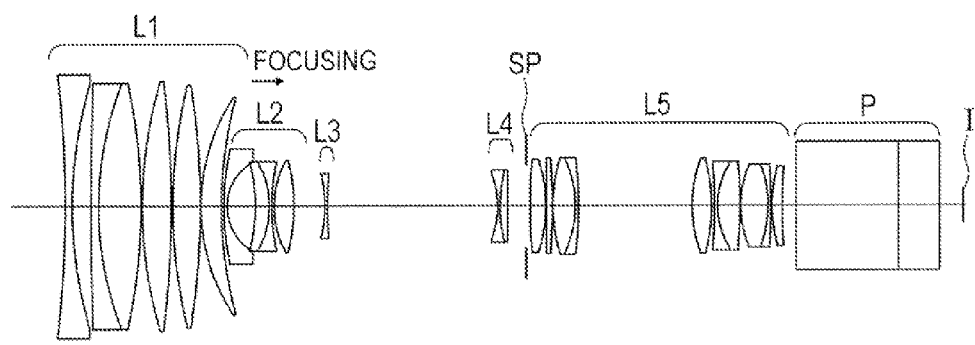
FIG. 9A is a lens cross-sectional view at the wide angle end according to Numerical Embodiment 5.
Figure 9B:
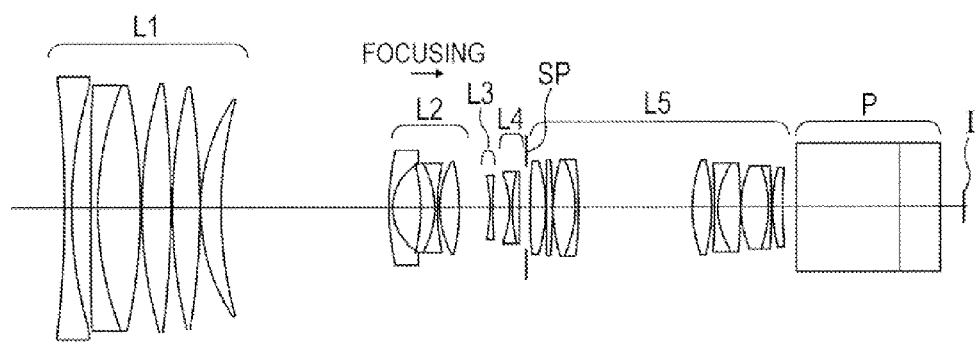
FIG. 9B is a lens cross-sectional view at the telephoto end according to Numerical Embodiment 5.

FIGS. 9A and 9B are lens cross-sectional views of the zoom lens according to Embodiment 5 of the present invention at the wide angle end and the telephoto end, respectively. FIGS. 10A and 10B are aberration diagrams of the zoom lens according to Embodiment 5 of the present invention at the wide angle end and the telephoto end when the object distance is infinity, respectively. Embodiment 5 is directed to the zoom lens having the high magnification and the large aperture with a zoom ratio of 21.0 and an F-number at the wide angle end of 1.9.

Numerical data corresponding to Embodiment 5 is shown below as Numerical Embodiment 5. Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 5

Unit mm

Surface data

| Surface number | r | d | nd | vd | Effective diameter |
|---|---|---|---|---|---|
| 1 | −369.587 | 2.30 | 1.80100 | 35.0 | 81.72 |
| 2 | 141.738 | 6.06 | | | 77.51 |
| 3 | 1457.606 | 2.30 | 1.72825 | 28.5 | 77.16 |
| 4 | 108.138 | 13.69 | 1.43875 | 94.9 | 77.21 |
| 5 | −186.328 | 0.40 | | | 77.72 |
| 6 | 142.574 | 9.33 | 1.45600 | 90.3 | 78.85 |
| 7 | −319.651 | 0.52 | | | 78.71 |
| 8 | 167.925 | 8.81 | 1.72916 | 54.7 | 76.73 |
| 9 | −248.635 | 0.15 | | | 76.23 |
| 10 | 64.169 | 6.56 | 1.77250 | 49.6 | 68.67 |
| 11 | 133.457 | (Variable) | | | 67.91 |
| 12* | 82.269 | 1.10 | 1.83481 | 42.7 | 35.82 |
| 13 | 16.560 | 9.09 | | | 27.41 |
| 14 | −57.782 | 4.50 | 1.92286 | 18.9 | 27.34 |
| 15 | −28.384 | 0.80 | 1.83481 | 42.7 | 27.48 |
| 16 | 68.869 | 0.71 | | | 27.46 |
| 17 | 30.859 | 6.39 | 1.69895 | 30.1 | 28.44 |
| 18 | −60.076 | (Variable) | | | 28.15 |
| 19 | −43.379 | 0.80 | 1.88300 | 40.8 | 19.51 |
| 20 | 126.036 | (Variable) | | | 19.12 |
| 21 | −28.270 | 0.75 | 1.74320 | 49.3 | 19.88 |
| 22 | 46.672 | 2.45 | 1.84666 | 23.8 | 21.61 |
| 23 | −891.401 | (Variable) | | | 22.05 |
| 24 | ∞ | 1.30 | | | 26.55 |
| 25 | 193.302 | 5.02 | 1.67003 | 47.2 | 27.89 |
| 26 | −48.648 | 0.15 | | | 28.74 |
| 27 | −1546.554 | 2.00 | 1.56732 | 42.8 | 29.17 |
| 28 | −193.197 | 0.15 | | | 29.36 |
| 29 | 52.351 | 7.18 | 1.48749 | 70.2 | 29.69 |
| 30 | −35.189 | 1.00 | 1.88300 | 40.8 | 29.48 |
| 31 | −127.497 | 36.60 | | | 29.82 |
| 32 | 44.582 | 6.25 | 1.48749 | 70.2 | 29.23 |
| 33 | −57.976 | 0.91 | | | 28.76 |
| 34 | −203.971 | 1.00 | 1.88300 | 40.8 | 27.29 |
| 35 | 25.675 | 7.21 | 1.48749 | 70.2 | 25.98 |
| 36 | −158.827 | 0.15 | | | 25.88 |
| 37 | 32.650 | 8.82 | 1.48749 | 70.2 | 25.51 |
| 38 | −39.316 | 1.00 | 1.88300 | 40.8 | 24.68 |
| 39 | −274.040 | 0.34 | | | 24.65 |
| 40 | 47.813 | 3.24 | 1.57501 | 41.5 | 24.43 |
| 41 | 160.055 | 4.50 | | | 23.90 |
| 42 | ∞ | 33.00 | 1.60859 | 46.4 | 40.00 |
| 43 | ∞ | 13.20 | 1.51633 | 64.1 | 40.00 |
| 44 | ∞ | (Variable) | | | 40.00 |
| Image | ∞ | | | | |

Aspherical surface data

Twelfth surface

K = 1.53525e+001 A 4 = −1.54706e−006 A 6 = −2.97405e−008
A 8 = 1.01594e−010 A10 = −1.98244e−013

Various data
Zoom ratio 21.00

| | | |
|---|---|---|
| Focal length | 7.90 | 165.90 |
| F-number | 1.90 | 2.70 |
| Half angle of field | 34.85 | 1.90 |
| Image height | 5.50 | 5.50 |
| Total lens length | 288.56 | 288.56 |
| BF | 7.47 | 7.47 |
| d11 | 0.74 | 53.93 |
| d18 | 9.93 | 9.93 |
| d20 | 54.77 | 5.42 |
| d23 | 5.91 | 2.08 |
| d44 | 7.47 | 7.47 |
| Incident pupil position | 49.24 | 636.60 |
| Exit pupil position | 1135.67 | 1135.67 |
| Front principal point position | 57.19 | 826.89 |
| Rear principal point position | −0.43 | −158.43 |

Zoom lens unit data

| Unit | First surface | Focal length | Lens structure length | Front principal point position | Rear principal point position |
|---|---|---|---|---|---|
| 1 | 1 | 69.86 | 50.12 | 33.90 | 6.51 |
| 2 | 12 | −51.67 | 22.59 | −11.50 | −37.76 |
| 3 | 19 | −36.26 | 0.80 | 0.11 | −0.31 |
| 4 | 21 | −43.35 | 3.20 | −0.12 | −1.87 |
| 5 | 24 | 51.79 | 133.02 | 54.03 | −113.57 |

Closest object distance

| Distance from first surface of lens | 1000 |
|---|---|

-continued

Unit mm

Single Lens data

| Lens | First surface | Focal length |
|---|---|---|
| 1 | 1 | −126.79 |
| 2 | 3 | −159.19 |
| 3 | 4 | 157.81 |
| 4 | 6 | 217.03 |
| 5 | 8 | 138.10 |
| 6 | 10 | 152.91 |
| 7 | 12 | −24.89 |
| 8 | 14 | 55.61 |
| 9 | 15 | −23.85 |
| 10 | 17 | 29.81 |
| 11 | 19 | −36.26 |
| 12 | 21 | −23.48 |
| 13 | 22 | 51.93 |
| 14 | 25 | 58.20 |
| 15 | 27 | 386.80 |
| 16 | 29 | 44.21 |
| 17 | 30 | −55.00 |
| 18 | 32 | 52.58 |
| 19 | 34 | −25.62 |
| 20 | 35 | 45.77 |
| 21 | 37 | 38.00 |
| 22 | 38 | −51.79 |
| 23 | 40 | 116.67 |
| 24 | 42 | 0.00 |
| 25 | 43 | 0.00 |

Embodiment 6

The zoom lens according to Embodiment 6 also has a configuration basically similar to that of the zoom lens according to Embodiment 1, but is different therefrom in that the fourth lens unit L4 does not move for zooming, and that the fifth lens unit L5 moves on the locus that is convex toward the object side for correcting the image plane variation accompanying the zooming (moves during zooming).

Figure 11A:
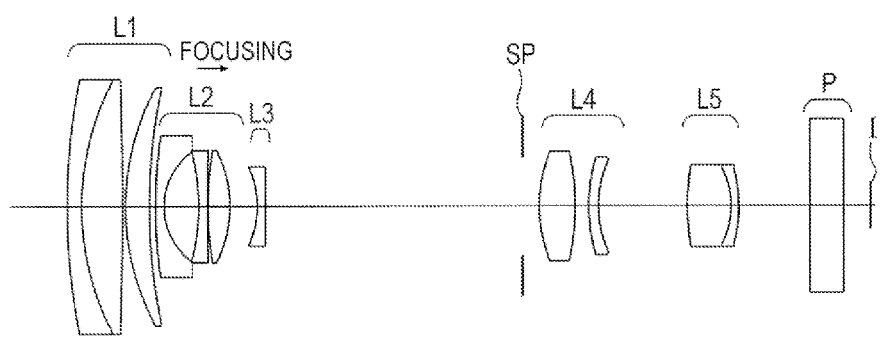
FIG. 11A is a lens cross-sectional view at the wide angle end according to Numerical Embodiment 6.
Figure 11B:
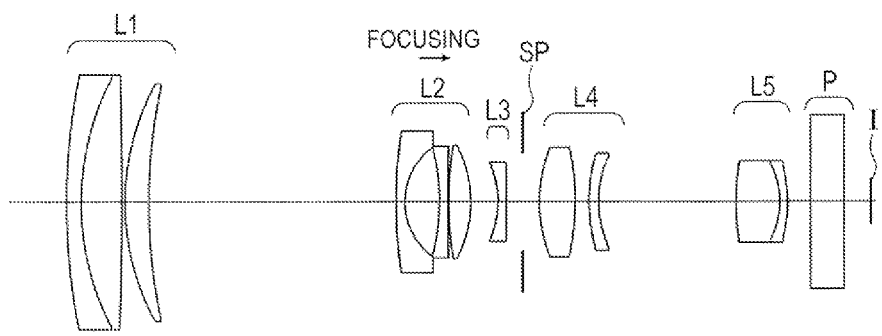
FIG. 11B is a lens cross-sectional view at the telephoto end according to Numerical Embodiment 6.
Figure 12A:
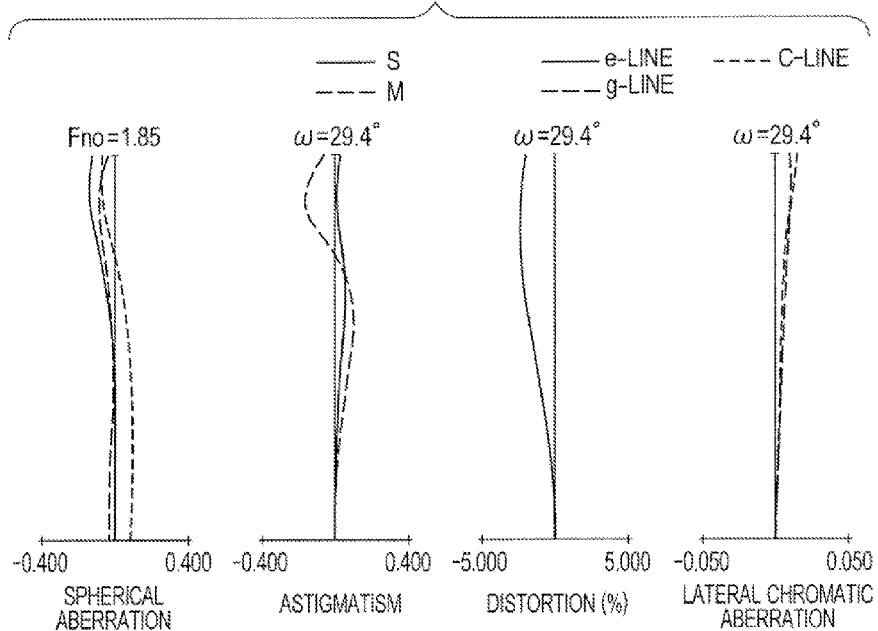
FIG. 12A is an aberration diagram at the wide angle end when the object distance is infinity according to Numerical Embodiment 6.
Figure 12B:
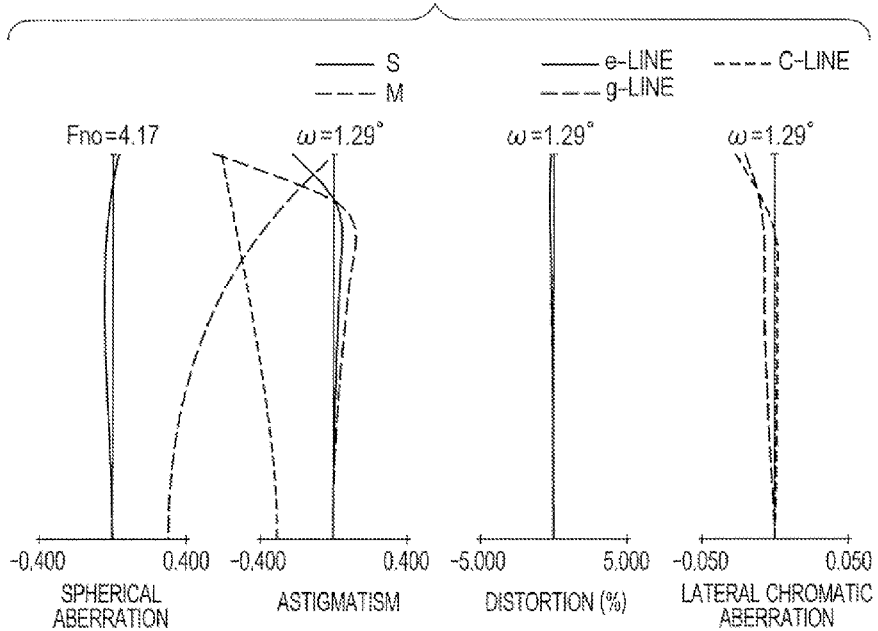
FIG. 12B is an aberration diagram at the telephoto end when the object distance is infinity according to Numerical Embodiment 6.

FIGS. 11A and 11B are lens cross-sectional views of the zoom lens according to Embodiment 6 of the present invention at the wide angle end and the telephoto end, respectively. FIGS. 12A and 12B are aberration diagrams of the zoom lens according to Embodiment 6 of the present invention at the wide angle end and when the object distance is infinity, respectively. Embodiment 6 is directed to the zoom lens having the high magnification and the large aperture with a zoom ratio of 25.0 and an F-number at the wide angle end of 1.85.

Numerical data corresponding to Embodiment 6 is shown below as Numerical Embodiment 6. Further, numerical values corresponding to Conditional Expressions (1), (2), (7), (8), and (9) in this embodiment are shown in Table 1. The zoom lens that satisfies all the conditions and achieves the reduction in size and the increase in magnification, as well as the suppression of the reduction in zoom ratio when the object distance is finite is realized.

Numerical Embodiment 6

Unit mm

Surface data

| Surface number | r | d | nd | vd | Effective diameter |
|---|---|---|---|---|---|
| 1 | 154.246 | 3.48 | 1.84666 | 23.8 | 59.22 |
| 2 | 64.499 | 9.67 | 1.69680 | 55.5 | 57.70 |
| 3 | −877.134 | 0.73 | | | 57.39 |
| 4 | 59.310 | 5.69 | 1.77250 | 49.6 | 55.19 |
| 5 | 139.650 | (Variable) | | | 54.26 |
| 6 | 119.744 | 2.00 | 1.88300 | 40.8 | 32.47 |
| 7 | 16.180 | 8.26 | | | 25.01 |
| 8 | −51.223 | 2.00 | 1.81600 | 46.6 | 24.85 |
| 9 | 579.472 | 0.14 | | | 25.27 |
| 10 | 81.722 | 5.24 | 1.80809 | 22.8 | 25.52 |
| 11 | −29.169 | (Variable) | | | 25.51 |
| 12 | −23.166 | 2.00 | 1.81600 | 46.6 | 17.62 |
| 13* | 1194.841 | (Variable) | | | 17.31 |
| 14 | ∞ | 4.03 | | | 23.09 |
| 15* | 32.434 | 8.53 | 1.58313 | 59.4 | 24.72 |
| 16 | −58.614 | 3.25 | | | 24.27 |
| 17 | 42.843 | 2.20 | 1.84666 | 23.8 | 21.88 |
| 18 | 25.482 | (Variable) | | | 20.53 |
| 19 | 63.286 | 10.36 | 1.65844 | 50.9 | 18.18 |
| 20 | −19.638 | 1.83 | 1.84666 | 23.8 | 16.71 |
| 21 | −35.934 | (Variable) | | | 16.53 |
| 22 | ∞ | 8.00 | 1.51633 | 64.1 | 40.00 |
| 23 | ∞ | (Variable) | | | 40.00 |
| Image | ∞ | | | | |

Aspherical surface data

Thirteenth surface

K = −1.63888e+004 A 4 = −7.17432e−006 A 6 = −1.98037e−008
A 8 = −4.94889e−010
Fifteenth surface K = −2.78702e+000 A 4 = −1.41795e−007 A 6 = 6.85729e−010
A 8 = −1.24667e−011

Various data
Zoom ratio 25.00

| Focal length | 9.75 | 243.79 |
|---|---|---|
| F-number | 1.85 | 4.17 |
| Half angle of field | 29.42 | 1.29 |
| Image height | 5.50 | 5.50 |
| Total lens length | 190.85 | 190.85 |
| BF | 6.37 | 6.37 |
| d 5 | 1.45 | 58.58 |
| d11 | 6.45 | 6.45 |
| d13 | 60.96 | 3.84 |
| d18 | 21.25 | 32.72 |
| d21 | 16.94 | 5.46 |
| d23 | 6.37 | 6.37 |
| Incident pupil position | 41.17 | 835.76 |
| Exit pupil position | −394.46 | 286.38 |
| Front principal point position | 50.68 | 1291.80 |
| Rear principal point position | −3.38 | −237.42 |

Zoom lens unit data

| Unit | First surface | Focal length | Lens structure length | Front principal point position | Rear principal point position |
|---|---|---|---|---|---|
| 1 | 1 | 86.76 | 19.58 | 4.20 | −7.33 |
| 2 | 6 | −91.37 | 17.64 | −26.39 | −57.55 |
| 3 | 12 | −27.69 | 2.00 | 0.02 | −1.08 |
| 4 | 14 | 56.45 | 18.02 | −1.17 | −13.35 |
| 5 | 19 | 42.63 | 12.20 | 4.77 | −2.83 |
| 6 | 22 | ∞ | 8.00 | 2.63 | −2.63 |

Closest object distance

| Distance from first surface of lens | 2000 |
|---|---|

Single Lens data

| Lens | First surface | Focal length |
|---|---|---|
| 1 | 1 | −132.01 |
| 2 | 2 | 86.22 |

-continued

| Unit mm | | |
|---|---|---|
| 3 | 4 | 128.83 |
| 4 | 6 | −21.26 |
| 5 | 8 | −57.30 |
| 6 | 10 | 26.90 |
| 7 | 12 | −27.69 |
| 8 | 15 | 36.94 |
| 9 | 17 | −78.10 |
| 10 | 19 | 23.84 |
| 11 | 20 | −53.41 |
| 12 | 22 | 0.00 |

TABLE 1

Table 1: Corresponding values of the conditional expressions in Numerical Embodiments 1 to 6

| Conditional Expression | Numerical Embodiment | | | | | |
|---|---|---|---|---|---|---|
| | 1 | 2 | 3 | 4 | 5 | 6 |
| (1) 1/β2W | −0.30 | −0.80 | 0.16 | 0.20 | −0.69 | −0.14 |
| (2) f2/f3 | 3.33 | 1.87 | 7.50 | 6.76 | 1.43 | 3.30 |
| (7) −β2t/β2w | 0.63 | 1.98 | −0.27 | −0.42 | 2.00 | 0.29 |
| (8) |β3t/β3w| | 107.17 | 33.72 | 216.95 | 68.04 | 14.23 | 135.73 |
| (9) |f1/f23| | 4.67 | 4.94 | 5.24 | 2.80 | 3.28 | 4.08 |

Figure 13:
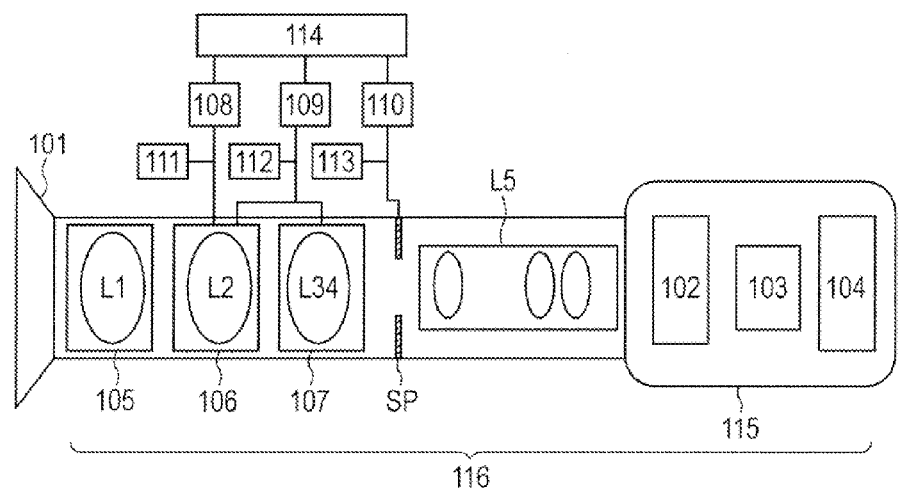
FIG. 13 is a schematic diagram of a main part of an image pickup apparatus according to the present invention.

FIG. 13 is a schematic diagram of a main part of the image pickup apparatus (television camera system) using the zoom lens in each embodiment as a photographing optical system.

Referring to FIG. 13, an image pickup apparatus 116 includes a zoom lens 101, which is any one of the zoom lenses according to Embodiments 1 to 6. The zoom lens 101 may be detachably mounted on a camera 115, to thereby constitute the image pickup apparatus 116. The zoom lens 101 includes the first lens unit L1, the magnification varying unit L2 for focusing, a magnification varying unit L34, and the fifth lens unit L5. The magnification varying units L2 and L34 include a second lens unit which moves on the optical axis for zooming or focusing. In addition, the magnification varying units L2 and L34 include a third lens unit and a fourth lens unit which move on the optical axis for correcting the image plane variation accompanying the zooming or for zooming.

Further, the zoom lens 101 includes an aperture stop SP. The zoom lens 101 includes driving mechanisms 106 and 107, such as a helicoid or a cam, which drive the magnification varying unit L2 and the magnification varying unit L34, respectively, along the optical axis. The image pickup apparatus 116 includes motors (driving units) 108 to 110, which electrically drive the driving mechanisms 106 and 107 and the aperture stop SP, respectively. Detectors 111 to 113, such as an encoder, a potentiometer, or a photo-sensor, are configured to detect the positions of the magnification varying unit L2 and the magnification varying unit L34 on the optical axis, and the aperture diameter of the aperture stop SP.

The camera 115 includes a glass block 102, which corresponds to an optical filter or a color separation prism provided within the camera 115. Further, the camera 115 includes a solid-state image pickup element (photoelectric transducer) 103, such as a charge-coupled device (CCD) sensor or a complementary metal-oxide semiconductor (CMOS) sensor. The solid-state image pickup element 103 is configured to receive a subject image formed by the zoom lens 101. Further, a central processing unit (CPU) 104 controls the driving of the camera 115 and the zoom lens main body 101, respectively. By applying the zoom lens according to the present invention to a television camera as described above, an image pickup apparatus having a high optical performance may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180898, filed Aug. 17, 2012, which is hereby incorporated by reference herein in its entirety.

What is claimed is:

1. A zoom lens, comprising, in order from an object side to an image side:
    a first lens unit having a positive refractive power which does not move;
    a second lens unit having a negative refractive power which moves during zooming and focusing;
    a third lens unit having the negative refractive power which moves during zooming;
    a fourth lens unit having one of the negative refractive power and the positive refractive power; and
    a fifth lens unit having the positive refractive power,
    wherein the following conditions are satisfied:

$$-0.95 < 1/\beta 2w < 0.4; \text{ and}$$

$$1.2 < f2/f3 < 10,$$

where β2w is a lateral magnification of the second lens unit at a wide angle end when an object distance is infinity, and f2 and f3 are focal lengths of the second lens unit and the third lens unit, respectively.

2. A zoom lens according to claim 1, wherein the following conditions are satisfied:

$$-0.7 < -\beta 2t/\beta 2w < 3; \text{ and}$$

$$9 < |\beta 3t/\beta 3w|,$$

where β2t is a lateral magnification of the second lens unit at a telephoto end when the object distance is infinity, β3w is a lateral magnification of the third lens unit at the wide angle end, and β3t is a lateral magnification of the third lens unit at the telephoto end.

3. A zoom lens according to claim 1, wherein the second lens unit comprises at least two negative lenses and at least one positive lens.

4. A zoom lens according to claim 1, wherein the following conditions are satisfied:

$$2 < |f1/f23| < 6; \text{ and}$$

$$f23 = \frac{f2 \times f3}{f2 + f3}$$

where f1 is a focal length of the first lens unit, and f23 is a combined focal length of the second lens unit and the third lens unit.

5. A zoom lens according to claim 1,
    wherein the second lens unit and the third lens unit move from the object side to the image side during zooming from the wide angle end to the telephoto end, and
    wherein under a condition that a zoom ratio is constant, at any zoom ratio, the second lens unit moves to the image side during focusing from infinity to a finite distance.

6. A zoom lens according to claim 1, wherein the fourth lens unit moves during zooming, and the fifth lens unit does not move for zooming.

7. A zoom lens according to claim 1, wherein the fourth lens unit does not move for zooming, and the fifth lens unit moves during zooming.

8. A zoom lens according to claim 2, wherein the second lens unit comprises at least two negative lenses and at least one positive lens.

9. A zoom lens according to claim 2, wherein the following conditions are satisfied:

$$2.5 < |f1/f23| < 5.5; \text{ and}$$
$$f23 = \frac{f2 \times f3}{f2 + f3}$$

where f1 is a focal length of the first lens unit, and f23 is a combined focal length of the second lens unit and the third lens unit.

10. A zoom lens according to claim 2,
wherein the second lens unit and the third lens unit move from the object side to the image side during zooming from the wide angle end to the telephoto end, and
wherein under a condition that a zoom ratio is constant, at any zoom ratio, the second lens unit moves to the image side during focusing from infinity to a finite distance.

11. A zoom lens according to claim 2, wherein the fourth lens unit moves during zooming, and the fifth lens unit does not move for zooming.

12. A zoom lens according to claim 2, wherein the fourth lens unit does not move for zooming, and the fifth lens unit moves during zooming.

13. An image pickup apparatus, comprising:
a zoom lens, comprising, in order from an object side to an image side:
  a first lens unit having a positive refractive power which does not move;
  a second lens unit having a negative refractive power which moves during zooming and focusing;
  a third lens unit having the negative refractive power which moves during zooming;
  a fourth lens unit having one of the negative refractive power and the positive refractive power; and
  a fifth lens unit having the positive refractive power,
wherein the following conditions are satisfied:

$-0.95 < 1/\beta2w < 0.4;$ and $1.2 < f2/f3 < 10,$ where $\beta2w$ is a lateral magnification of the second lens unit at a wide angle end when an object distance is infinity, and f2 and f3 are focal lengths of the second lens unit and the third lens unit, respectively; and
a solid-state image pickup element for receiving an image formed by the zoom lens.

14. An image pickup apparatus, comprising:
a zoom lens, comprising, in order from an object side to an image side:
  a first lens unit having a positive refractive power which does not move;
  a second lens unit having a negative refractive power which moves during zooming and focusing;
  a third lens unit having the negative refractive power which moves during zooming;
  a fourth lens unit having one of the negative refractive power and the positive refractive power; and
  a fifth lens unit having the positive refractive power,
wherein the following conditions are satisfied:

$-0.95 < 1/\beta2w < 0.4;$ and $1.2 < f2/f3 < 10,$ where $\beta2w$ is a lateral magnification of the second lens unit at a wide angle end when an object distance is infinity, and f2 and f3 are focal lengths of the second lens unit and the third lens unit, respectively,
wherein the following conditions are satisfied:

$-0.7 < -\beta2t/\beta2w < 3;$ and $9 < |\beta3t/\beta3w|,$ where $\beta2t$ is a lateral magnification of the second lens unit at a telephoto end when the object distance is infinity, $\beta3w$ is a lateral magnification of the third lens unit at the wide angle end, and $\beta3t$ is a lateral magnification of the third lens unit at the telephoto end; and
a solid-state image pickup element for receiving an image formed by the zoom lens.

\* \* \* \* \*